US012132760B2

(12) United States Patent
Maisuria et al.

(10) Patent No.: US 12,132,760 B2
(45) Date of Patent: Oct. 29, 2024

(54) CREDENTIAL INPUT DETECTION AND THREAT ANALYSIS

(71) Applicant: MICROSOFT TECHNOLOGY LICENSING, LLC, Redmond, WA (US)

(72) Inventors: Paresh Maisuria, Issaquah, WA (US); Ali Alabbas, Sammamish, WA (US); Abhishek Sagar, Wake Forest, NC (US); Mara Beth Fortini, Sammamish, WA (US); Rupo Zhang, Redmond, WA (US); Christian Stockwell, Seattle, WA (US); Michael David McCormack, Redmond, WA (US); Jason Joseph Weber, Bainbridge Island, WA (US); Charles J. Strempler, Seattle, WA (US); Sinclaire R. Hamilton, Sammamish, WA (US); Brian Keith Catlin, Princeville, HI (US); Richard Joseph Murillo, Issaquah, WA (US); Robert G. Lefferts, Redmond, WA (US); Eric P. Douglas, Kirkland, WA (US); Christian Seifert, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 231 days.

(21) Appl. No.: 17/685,697

(22) Filed: Mar. 3, 2022

(65) Prior Publication Data

US 2023/0283633 A1     Sep. 7, 2023

Related U.S. Application Data

(60) Provisional application No. 63/245,598, filed on Sep. 17, 2021.

(51) Int. Cl.
*G06F 21/00*     (2013.01)
*H04L 9/40*      (2022.01)

(52) U.S. Cl.
CPC ...... *H04L 63/1483* (2013.01); *H04L 63/1416* (2013.01); *H04L 63/1425* (2013.01); *H04L 63/1466* (2013.01); *H04L 63/20* (2013.01)

(58) Field of Classification Search
CPC ............. H04L 63/1483; H04L 63/1416; H04L 63/1425; H04L 63/1466; H04L 63/20;
(Continued)

(56) References Cited

U.S. PATENT DOCUMENTS 7,152,244 B2    12/2006   Toomey
7,886,345 B2     2/2011   Kaliski et al.
(Continued)

FOREIGN PATENT DOCUMENTS

EP          2646903 A1    10/2013

OTHER PUBLICATIONS

Abura'ed, et al., "Mobile Phishing Attack for Android Platform", In Proceedings of the 10th International Conference on Innovations in Information Technology, Nov. 9, 2014, pp. 18-23.
(Continued)

*Primary Examiner* — Ghazal B Shehni
(74) *Attorney, Agent, or Firm* — Shook, Hardy & Bacon L.L.P.

(57) ABSTRACT

The technology described herein identifies and mitigates phishing attempts by analyzing user input received at the operating system level. Initially, a credential, such as a username or password, is registered with the threat detection system. The technology described herein intercepts user input at the operating system level, generates a hash of the input, and compares it with a hash of a credential being monitored. A credential entry is detected when a hash for the
(Continued)

character string entered matches a hash for a credential being monitored. The technology described herein will perform a threat assessment when a secret entry is detected. The threat assessment may use the application context and the network context as inputs to the assessment. Various mitigation actions may be taken when a threat is detected.

20 Claims, 19 Drawing Sheets

(58) Field of Classification Search
CPC ............... H04L 63/08; H04L 63/1433; G06F 2221/2117; G06F 21/31
See application file for complete search history.

(56) References Cited

U.S. PATENT DOCUMENTS

| | | | |
|---|---|---|---|
| 8,966,645 | B2 | 2/2015 | Low |
| 11,057,373 | B2 | 7/2021 | Yarabolu et al. |
| 2016/0366122 | A1 | 12/2016 | Rykowski et al. |
| 2017/0006020 | A1 | 1/2017 | Falodiya |
| 2017/0063393 | A1* | 3/2017 | Shelton ............... G06F 3/0233 |
| 2018/0060564 | A1* | 3/2018 | Shapiro ............... G06F 21/31 |
| 2021/0224048 | A1* | 7/2021 | Keller ............... G06F 8/40 |
| 2022/0207121 | A1* | 6/2022 | Singh ............... H04L 63/1483 |

OTHER PUBLICATIONS

"International Search Report and Written Opinion Issued in PCT Application No. PCT/US2022/041143", Mailed Date: Dec. 6, 2022, 11 Pages.

"Is it Possible to Detect Password Length from Hash? Does Doubling your Password Add More Security?", Retrieved From: https://security.stackexchange.com/questions/29083/is-it-possible-to-detect-password-length-from-hash-does-doubling-your-password, Jan. 15, 2013, 5 Pages.

"Microsoft Windows Security", Retrieved From: https://www.microsoftpressstore.com/articles/article.aspx?p=2228450&seqNum=8, Mar. 15, 2012, 10 Pages.

Kenny L., "Password Cracking Is Easy: Here's How to Do It", Retrieved From: https://kennymuli.medium.com/password-cracking-is-easy-heres-how-to-do-it-875806a1e42a, Jan. 29, 2020, 10 Pages.

Arias, Dan, "Hashing Passwords: One-Way Road to Security", Retrieved From: https://web.archive.org/web/20220426023449/https://auth0.com/blog/hashing-passwords-one-way-road-to-security/, Sep. 30, 2019, 16 Pages.

Balagani, et al., "The Impact of Application Context on Privacy and Performance of Keystroke Authentication Systems", In Journal of Computer Security, vol. 26, Issue 4, Jul. 10, 2018, 14 Pages.

Hornby, et al., "Salted Password Hashing—Doing it Right", Retrieved From: https://www.codeproject.com/Articles/704865/Salted-Password-Hashing-Doing-it-Right, Feb. 14, 2016, 15 Pages.

Jake, "Hashcat Tutorial—The Basics of Cracking Passwords with Hashcat", Retrieved From: https://web.archive.org/web/20210417053317/https://laconicwolf.com/2018/09/29/hashcat-tutorial-the-basics-of-cracking-passwords-with-hashcat/, Sep. 29, 2018, 14 Pages.

"Knuth-Morris-Pratt Algorithm", Retrieved From: https://en.wikipedia.org/wiki/Knuth%E2%80%93Morris%E2%80%93Pratt_algorithm, Apr. 13, 2022, 7 Pages.

"Bcrypt", Retrieved From: https://en.wikipedia.org/w/index.php?title=Bcrypt&oldid=1083495173, Apr. 19, 2022, 9 Pages.

* cited by examiner (COPY TO LSASS)

(COMPARE KEYSTROKE HASH TO PASSWORD HASH)

(DETECT PHISHING WEBSITE)

(DETECT MAN-IN-THE MIDDLE ATTACK)

(PHISHING DOCUMENT)

(DETECT PHISHING CHAT)

(PHISHING VIA A NOTIFICATION)

(PASSWORD REUSE)

(CONFIRM NO SECRET MISUSE)

CREDENTIAL INPUT DETECTION AND THREAT ANALYSIS

CROSS-REFERENCE TO RELATED APPLICATIONS

The present application claims the benefit of U.S. Provisional Application No. 63/245,598, filed and entitled, "CREDENTIAL INPUT DETECTION AND THREAT ANALYSIS", the entirety of which is incorporated by reference herein.

BACKGROUND

Schemes to acquire another person's credential and password information fraudulently have become common on the Internet. Such schemes are commonly referred to as "phishing." Phishing schemes can be quite elaborate and continue to grow in their level of sophistication. In some schemes, a user is diverted from a desired page to a fraudulent page that is plausibly similar in appearance to the desired page. The user may be led to this type of fraudulent page by clicking a link, by incorrectly typing a web address, or by any other mechanism. Other schemes can be based on a user being convinced to visit a fraudulent page based on incorrect information, such as an e-mail purporting to be from a known business. In still other schemes, a user may correctly enter information to visit a desired site, but the user can be re-routed due to a corrupted server. When a user is presented with a login and password prompt, the user often has little or no context with which to evaluate whether the request for a login credential is legitimate. This makes advanced phishing schemes difficult or even impossible for a user to detect.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Initially, a credential, such as a username or password, is registered with the threat detection system. Aspects of the technology described herein are not limited for use with a username or password. A credential may be any type of secret or confidential information, such as Social Security numbers, credit card information, driver's license numbers, passport IDs, could be monitored by the system described herein. In one aspect, a username and password for the operating system is automatically registered. A user interface may be provided for a user or other individual (e.g., system administrator) to register additional credentials for monitoring.

The registered credentials are associated with the user in a credential data store, which may be described as a credential manager herein. In one aspect, a hash of the credential is stored rather than the credential. In aspects, a hash of the credential is generated using a first function and stored for comparison with a hash generated from the text the user entered.

The technology described herein identifies and mitigates phishing attempts by analyzing user input received at the operating system level. Analyzing the input as it is received at the operating system level allows for the detection of threats that may not be detected by an analysis of input at the application level. The technology described herein will perform a threat assessment when a credential entry is detected. The threat assessment may use the application context and the network context as inputs to the assessment. Among other possible classifications, the threat assessment may classify the credential input as a valid webpage, safe/unsafe application, invalid certificate, password reuse, untrusted, known malicious and unknown.

Various mitigation actions may be taken when a threat is detected. A user and/or system administrator may specify the mitigation action taken when a threat is detected. Different mitigation actions may be specified for different threat classifications.

BRIEF DESCRIPTION OF THE DRAWINGS

The technology described herein is illustrated by way of example and not limitation in the accompanying figures in which like reference numerals indicate similar elements and in which.

DETAILED DESCRIPTION

Figure 1:
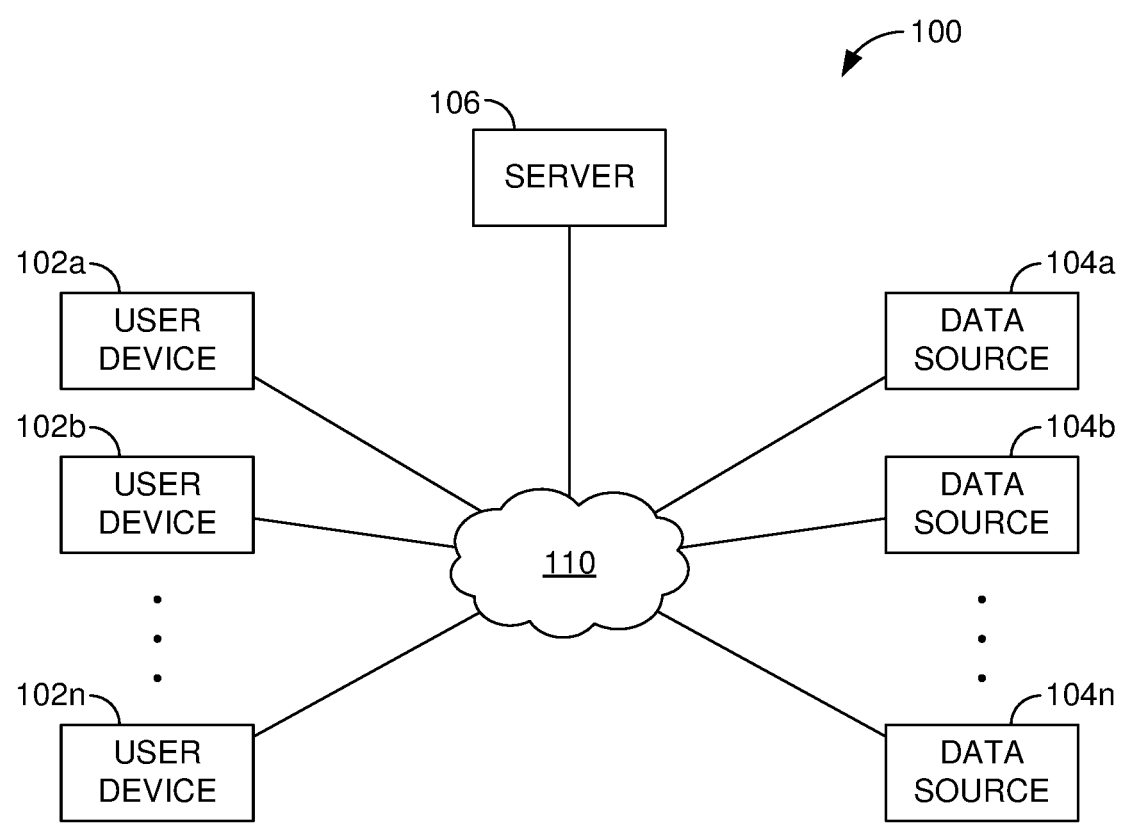
FIG. 1 is a block diagram of an example operating environment suitable for implementations of the present disclosure.

The various technologies described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein identifies and mitigates phishing attempts by analyzing user input received at the operating system level. Analyzing the input as it is received at the operating system level allows for the detection of threats that may not be detected by an analysis of input at the application level. A phishing application soliciting credentials is one example of an attack that could avoid detection at the application level, but can be detected by analyzing input received at the operating system level according to the technology described herein.

Initially, a credential, such as a username or password, is registered with the threat detection system. Aspects of the technology described herein are not limited for use with a username or password. A credential may be any type of secret or confidential information, such as Social Security numbers, credit card information, driver's license numbers, passport IDs, could be monitored by the system described herein. In one aspect, a username and password for the operating system is automatically registered. A user interface may be provided for a user or other individual (e.g., system administrator) to register additional credentials for monitoring.

The registered credentials are associated with the user in a credential data store, which may be described as a credential manager herein, and may be associated with a local operating system. In one aspect, a hash of the credential is stored rather than the credential. In aspects, a hash of the credential is generated using a first function and stored for comparison with a hash generated from a user input. The technology described herein will perform a threat assessment when a credential entry is detected, without the credential or credential hash leaving the local operating system.

The technology described herein intercepts user input at the operating system level, generates a hash of the input, and compares it with a hash of a credential being monitored. In one aspect, a hash of the last n characters received is generated where n is the character length of the credential. For example, a hash of the last eight characters entered may be generated and compared to a hash of an eight-character password. In another aspect, hashes of less than the full credential are generated and used to detect potential entry of a credential before the entry is complete. For example, a hash of four characters, five characters, six characters and seven characters could be generated in order to anticipate the entry of an eight-character password. In this scenario, the input strings are hashed at the character lengths that match hashes of partial credentials stored in the credential manager.

A credential entry is detected when a hash for the character string entered matches a hash for a credential being monitored. A potential credential entry is detected when a hash of the character string entered matches a hash for a partial credential.

The technology described herein will perform a threat assessment when a credential entry is detected. The threat assessment may use the application context and the network context as inputs to the assessment. Other information may also be used in the threat assessment process. Various sensors are used to identify characteristics of the application context and the network context. Aspects of the technology described herein, may use multiple context sensors: generic sensors, custom sensors, and enlightened sensors. Generic sensors provide basic network and process metadata for surfacing context about the identified threat. Custom sensors will be application specific sensors used for first-party applications, browsers, messaging, and other applications where credential entry occurs as derived from telemetry.

Applications with enlightened sensors may leverage an API to directly provide context to the operating system. These applications may be specifically programed to interact with the technology described herein. In aspects, code within the operating system shell layer may use the public API.

Among other possible classifications, the threat assessment may classify the credential input as a valid/invalid location, safe/unsafe application, invalid certificate, password reuse, untrusted, known malicious and unknown.

As used herein, a valid location classification is assigned when a credential matches the appropriate identity providers and authentication servers used by an organization associated with the credential. For example, login.microsoft.com is associated with MICROSOFT. When a credential associated with the user's MICROSOFT account is entered when the network context shows the credential is being communicated to login.microsoft.com then the credential entry event may be classified as a valid location. If the network context shows a URL, or other characteristic, that is not associated with the credential's organization then the location may be classified as invalid. An invalid classification may trigger a mitigation action, such as blocking communication of the credential to the URL or suspension of the credential.

As used herein, a safe/unsafe application is a prior classification assigned to the application receiving the password/credential entry. The classification indicates whether the application is safe or unsafe for receiving plain-text passwords. The application in question may be the active application to which the credential is addressed. Some applications may be classified as unsafe for all passwords because it is known to be used in phishing attacks or otherwise classified as unsecure or unsafe. For example, even if the application is secure, it is an unsafe practice to enter your password in the application, such as might occur if a user types a password into an email or document.

As used herein, an invalid certificate classification occurs when a location that is not known to be bad has an invalid certificate, which may indicate a potential man in the middle attack. The certificate may be part of the network context.

As used herein, password reuse occurs when a password registered with a first organization is entered to logon to a trusted site of a different organization. For example, using a MICROSOFT credential to login to Facebook.com may be password reuse. In this scenario, the user may have chosen the same password for two different accounts, which is an unsafe practice. Some organizations have policies that prohibit employees from using the organization password for other accounts. Detection of password reuse may result in a notification being communicated to the user and/or the organization. Suspension of the password is another possible mitigation in response to detecting password reuse. Password reuse, as used herein, is different from password history enforcement, which may prevent a user from using the same password twice on a single system at different times. For example, a system that requires new passwords every month may prevent the user from reusing a password previously used on the system. Password reuse, as used herein, detects use of a single password on two different systems (e.g., work account and social media account).

As used herein, an untrusted classification may be assigned when a password is entered on an untrusted site (as indicated by a source that tracks known phishing sites and/or sites that pose a security risk).

As used herein, a known malicious classification may be assigned when a password is entered on a known malicious site (as indicated by a source that tracks known phishing sites and/or sites that pose a security risk).

As used herein, an unknown classification may be assigned when a password entry does not fit into any of available classifications. The unknown classification may also be used when two or more of the classifications apply. For example, if there are two network connections and the assessment of one results in untrusted while the other results in password reuse. An unknown classification could also be assigned when that the site appears to be a new phishing site that is yet to be tracked by any list of known phishing sites (or conversely safe/secure sites).

Various mitigation actions may be taken when a threat is detected. A user and/or system administrator may specify the mitigation action taken when a threat is detected. Different mitigation actions may be specified for different threat classifications. One type of mitigation is threat reporting. Useful sensor data and telemetry may be sent to a cloud protection service associated with the operating system vendor, to a system administrator associated with an organization (e.g., employer) managing the computing device. The same information may be made accessible to a user of the device being monitored. Phishing determinations may also be shared (considering all compliance and privacy guidelines) with a centralized threat protection service that would benefit from leveraging the phishing data to better protect customers from phishing.

The mitigation actions can also include user awareness efforts. From the user perspective, the phishing protection may have generic (not application specific) user interfaces that allow for blocking phishing attempts, changing passwords, warning about detected risks, phishing education, and social engineering training. These last two options may appeal to enterprises that would like to deliver targeted additional security training to end-users. Application specific user interfaces can also be used. The communication of threat detection information could be enabled via a public API.

Having briefly described an overview of aspects of the technology described herein, an exemplary operating environment in which aspects of the technology described herein may be implemented is described below in order to provide a general context for various aspects.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. Each of the components shown in FIG. 1 may be implemented via any type of computing device, such as computing device 1700 described in connection to FIG. 17, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n may be client devices on the client-side of operating environment 100, while server 106 may be on the server-side of operating environment 100. In aspects, the technology described herein may take the form of a security function running on a single user device. The security function may be part of the user device's operating system. The user devices may be protected by the threat detection technology described herein. In particular, the threat detection may intercept user input at the operating system level, detect credential input, and conduct a threat assessment. The threat may by a phishing attempt originating on the server-side of the operating environment 100.

Server 106 may comprise server-side software designed to work in conjunction with client-side software on user devices 102a and 102b through 102n to implement any combination of the features and functionalities discussed in the present disclosure. For example, the server 106 may run a threat detection system that receives information about threats analyzed or detected. System administrators for an organization may use the server 106 to set monitoring and mitigation parameters for the threat detection system running on user devices associated with the organization. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 10 herein. By way of example and not limitation, a user device may be embodied as a personal computer (PC), a laptop computer, a mobile device, a smartphone, a tablet computer, a smart watch, a wearable computer, a fitness tracker, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100. For example, the data sources may comprise email servers, social media servers, or other sources of objects that may be used to mount a phishing attack that is identified through the technology described herein. Data sources 104a and 104b through 104n may be discrete from user devices 102a and 102b through 102n and server 106 or may be incorporated and/or integrated into at least one of those components.

Figure 2:
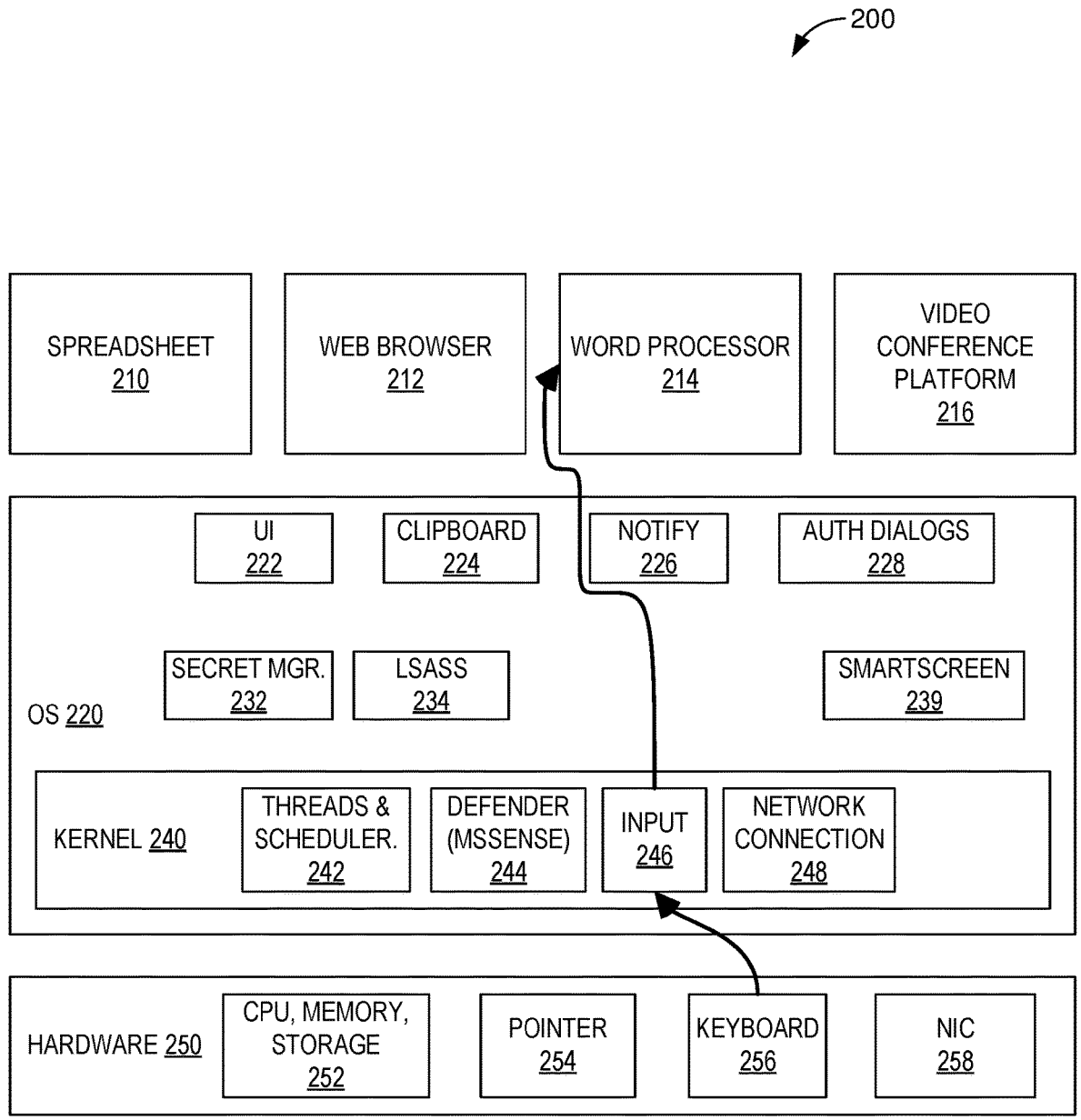
FIGS. 2-4 are a diagrams depicting the capture of keyboard and analysis of a keyboard entry at the operating system level, in accordance with an aspect of the technology described herein.

Operating environment 100 may be utilized to implement one or more of the components of computing environment 200, described in FIG. 2, including components for password entry detection, context collection, threat assessment, mitigation, and user awareness.

Figure 3:
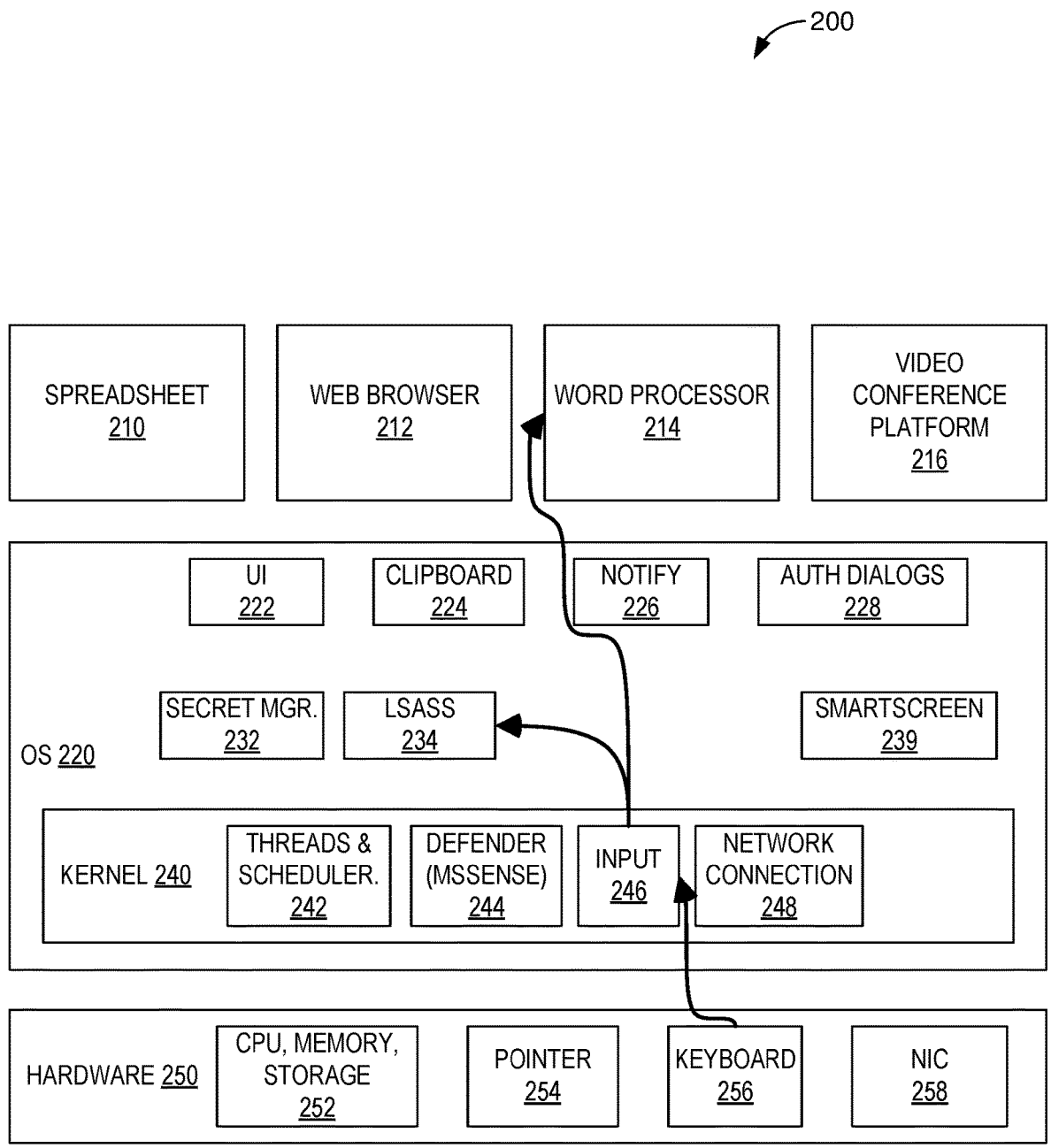
Figure 4:
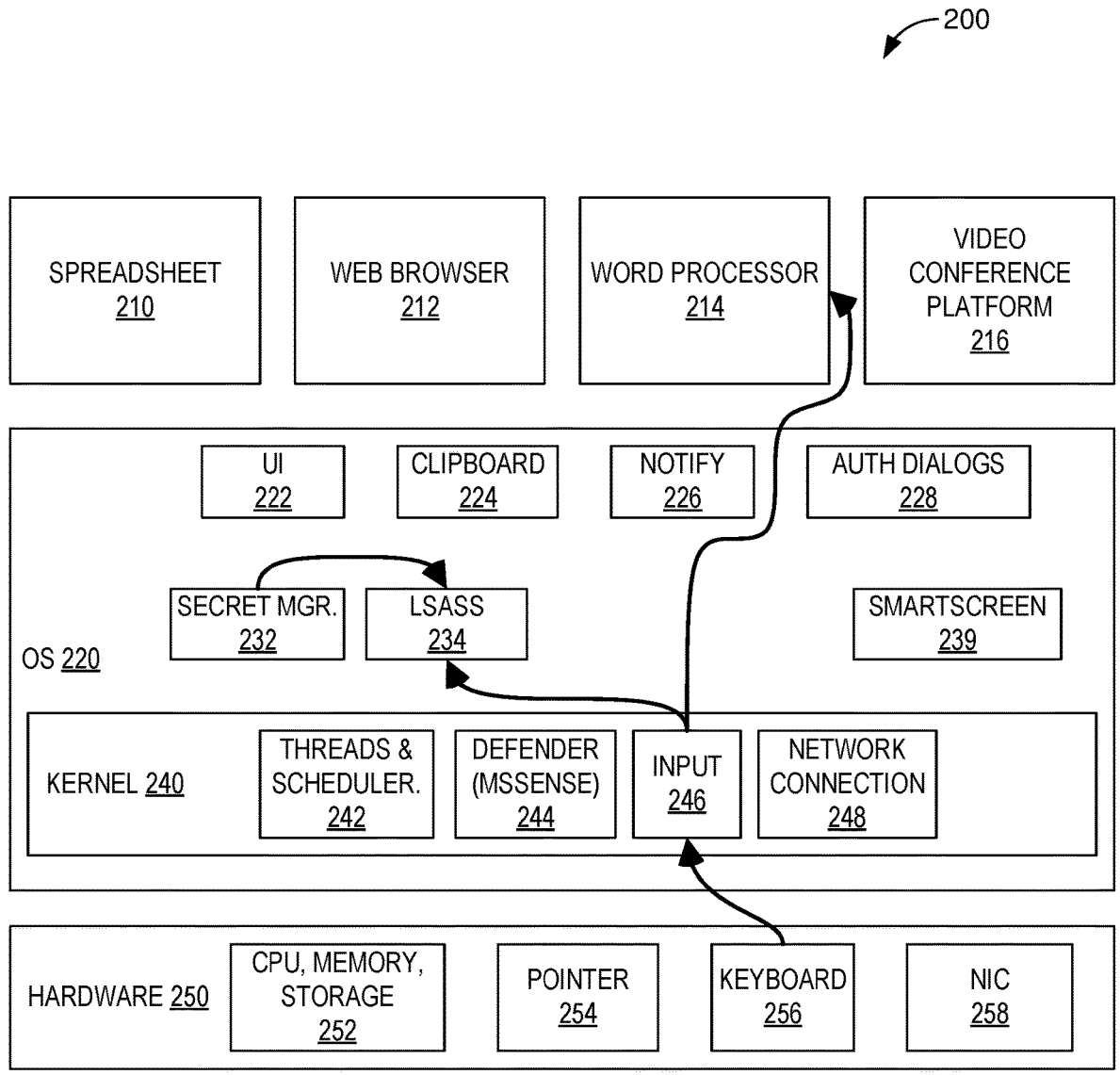

Turning now to FIG. 2, a computing environment 200 suitable for use with aspects of the technology described herein is provided. FIGS. 2-4 are used herein to illustrate how keystrokes are entered and may be analyzed by the technology described herein. A brief description of the components is shown before the actions to taken to analyze keystrokes are described. Some components described in FIG. 2 are described using terms often used to describe components of the WINDOWS operating system provided by MICROSOFT. However, aspects of the technology described herein are not limited to use with WINDOWS. The features of the technology described herein may be added to other operating systems, which include many of the same components and perform similar features.

The computing environment 200 comprises a hardware layer 250, operating system components 220, kernel components 240 and example applications. Together with components not shown, the operating system components 220 may be described as an operating system. Some operating systems may combine a user mode and kernel mode or move operations around. In WINDOWS, the processor switches between the two modes depending on what type of code is running on the processor. Applications run in user mode, and core operating system components run in kernel mode. While many drivers run in kernel mode, some drivers may run in user mode.

When a user-mode application starts, the operating system creates a process for the application. The process provides the application with a private virtual address space and a private handle table. Because an application's virtual address space is private, one application cannot alter data that belongs to another application. In addition to being private, the virtual address space of a user-mode application is limited. A processor running in user mode cannot access virtual addresses that are reserved for the operating system. Limiting the virtual address space of a user-mode application prevents the application from viewing, altering, and possibly damaging, critical operating system data.

All kernel components 240 share the same system address space (which is accessible only from kernel-mode). This means that a kernel-mode driver is not isolated from other drivers and the operating system itself.

As used herein, the operating system components 220 may comprise kernel components 240. Many components of the operating system, such as a hardware abstraction layer between the hardware and the kernel components 240, are not shown in FIG. 2, which includes illustrative components and components used in threat detection. The kernel, of which the kernel components 240 are a part, is a computer program at the core of a computer's operating system and has control over the system. The kernel facilitates interactions between hardware and software components. The kernel controls hardware resources (e.g. I/O, memory) via device drivers, arbitrates conflicts between processes concerning such resources, and optimizes the utilization of common resources (e.g. CPU, memory, and storage 252). On some systems, the kernel is one of the first programs loaded on startup (after the bootloader). Once loaded, the kernel may handle the rest of startup as well as memory, peripherals, and input/output (I/O) requests from software, translating them into data-processing instructions for the CPU.

The code of the kernel may be loaded into a separate area of memory, which is protected from access by application software or other, less critical parts of the operating system. The kernel performs its tasks, such as running processes, managing hardware devices such as the hard disk, and handling interrupts, in this protected kernel space. In contrast, application programs like spreadsheets 210, browsers 212, word processors 214, or video conference platforms 216 may use a separate area of memory, sometimes described as a user mode. This separation helps prevent user data and kernel data from interfering with each other and causing instability and slowness, as well as preventing malfunctioning applications from affecting other applications or crashing the entire operating system.

The kernel components 240 include a thread manager and scheduler 242, a threat defender 244, an input manager 246, and a network connection manager 248. An operating system kernel may include additional components. The thread manager 240 handles the execution of threads in a process. An instance of a program runs in a process. Every process has an ID, a number that identifies it. A thread is a schedulable entity within a process, a stream of execution within a process.

The threat defender 244 provides access control and reporting functionality. One function in the context of the technology described herein is to provide a reporting pipeline to enterprises on the security wellbeing of an enterprise device, such as an employee's laptop. As such, verdicts for each credential entry may be passed through the threat defender 244 to the enterprise such that IT admins can be alerted to a potential phishing attack or unsafe credential entry. This reporting can be part of various mitigation actions, such as disabling a password. The operating system must be sure that the action is not a violation of system policy. For example, a device may or may not be accessible to all requests. For example, a driver may allow some requests to succeed or fail, depending on the permission of the entity making the request. The threat defender 244 may use an access control list (ACL) to determine which objects have what security. The threat defender 244 may perform access checking before a handle can be opened to an object (file, event, mutex, process, thread, etc.), and what operations may be performed on that object (read, write, delete, etc.).

The input manager 246 facilitates hardware input. A computer consists of various devices that provide input and output (I/O) to and from the outside world. Typical devices are keyboards, mice, audio controllers, video controllers, disk drives, networking ports, and so on. Device drivers provide the software connection between the devices and the operating system. The input manager 246 manages the communication between applications and the interfaces provided by device drivers.

The network connection manager 248 manages communications between the NIC 258, operating system components, and applications. The network connection manager 248 may provide network context information. The network manager may interact with one or more drivers to implement networking in the operating system.

The operating system components 220 may reside outside of the kernel and comprise a credential manager 232, the Local Security Authority Subsystem Service (LSASS) 234, input manager 236, and SmartScreen application 239. Operating system components are omitted from FIG. 2 for the sake of simplicity.

The credential manager 232 manages credentials. The credential manager 232 may use a credentials management API and credentials management user interface (UI) functions to obtain and manage credential information, such as user names and passwords. These functions request that the account information (e.g, MICROSOFT account, GOOGLE account) be used instead of the credentials established while logging on, such as a pin. Such requests typically occur when the logon credentials do not have permissions that are required by the application. The credentials management UI functions may provide interfaces with the appearance of the operating system user interface. These functions include customizable options that add user's information to the user's credentials store. The credential management 232 can receive credentials to be monitored for threat detection. In one aspect, the credential management interface allows monitoring and mitigation preferences to be provided.

The (LSASS) 234 is responsible for enforcing the security policy on the system. It verifies users logging on to a computer or server, handles password changes, and creates access tokens. The LSASS may provide stored credentials or secrets to other components described herein. For example, the LSASS may provide a credential for entry detection. Once entry is detected, a decision may be made whether the environment or context for the credential entry is secure.

SmartScreen 239 may determine whether a web site is potentially malicious by analyzing visited webpages looking for indications of suspicious behavior and by checking the visited sites against a dynamic list of reported and machine identified phishing sites and malicious software sites. The SmartScreen 239 may be in communication with a cloud component that attempts to identify phishing sites and malicious software sites. If it finds a match, SmartScreen 239 shows a warning to let the user know that the site might be malicious.

SmartScreen 239 may determine whether a downloaded app or app installer is potentially malicious by checking downloaded files against a list of reported malicious software sites and programs known to be unsafe. SmartScreen 239 may be in communication with a cloud component that attempts to identify whether a downloaded app or app installer is potentially malicious. If a malicious verdict is given, SmartScreen 239 shows a warning to let the user know that the site or application might be malicious. SmartScreen 239 may check downloaded files against a list of files that are well known and downloaded by many Windows users. If the file is not on that list, SmartScreen 239 shows a warning, advising caution.

The shell is the portion of the operating system that allows the user to communicate with the operating system, including the kernel. The operating system components 220 also comprise components that may be considered part of the OS shell, such as user interface component 222, clipboard 224, notification component 226, and authorization dialogs 228. The user interface component 222 provides the operating systems main user interface, such as the desktop in WINDOWS. The clipboard 224 in an interface feature that may capture objects (files, text, images) in the operating system user interface and/or application interfaces and perform an operation on the captured object (copy, cut, move). For example, the clipboard 224 may allow a user to copy text from a first application interface to a different interface or different location in the first application interface. The notification component 226 manages notifications provided through the operating system. The notifications may originate with an application or service, such as an email application or social media service. The notifications may allow the user to provide information and could be a potential phishing source, for example, through a compromised application. The authorization dialog 228 allows the user to provide and/or confirm information that is used to authenticate the user to various entities and components.

Among other components, the hardware layer comprises CPU, Memory, and storage 252, a pointer 254, a keyboard 256, and a network interface controller (NIC) 258. The CPU, memory, and storage may be similar to those described in FIG. 17. The pointer 254 may be a mouse, track ball, touch screen, touch pad, natural user input (e.g., gesture) interface or some other input device that controls a location of an interface pointer. The keyboard 256 may be physical keyboard or touchscreen keyboard.

The NIC 258 (also known as a network interface card, network adapter, LAN adapter or physical network interface, and by similar terms) is a computer hardware component that connects a computer to a computer network. The NIC allows computers to communicate over a computer network, either by using cables or wirelessly. The NIC may be both a physical layer and data link layer device, as it provides physical access to a networking medium and, for IEEE 802 and similar networks, provides a low-level addressing system through the use of MAC addresses that are uniquely assigned to network interfaces.

The example applications include a spreadsheet application 210, a web browser 212, a word processor application 214, and a video conference platform 216. These applications may be the source of phishing attacks detected by the technology described herein.

FIG. 2 illustrates how input signals from a keyboard 256 are communicated through the operating system to the application. In the example shown, a keystroke is entered on the keyboard 256, which causes a signal to be sent to the input component 246. The input component 246 receives a signal (e.g., scancode) from the keyboard driver (not shown) and may convert it to a new signal that identifies the character indicated by the keystroke, for example, as Unicode text. The character is then passed to the active application (the application into which the input is addressed), which in this case is the word processor 214. The word processor 214 then takes action based on the keystroke (e.g., enters the keystroke in an active document). The flow shown in FIG. 2 may by the typical communications that occur apart from the technology described herein.

FIG. 3 shows that aspects of the technology described herein use the input component 246 to copy the keystroke to the LSASS 234. As previously described, the keystroke is also sent to the Word processor 214. The LSASS 234 may maintain a keystroke buffer that stores that last x number of keystrokes received.

Figure 5:
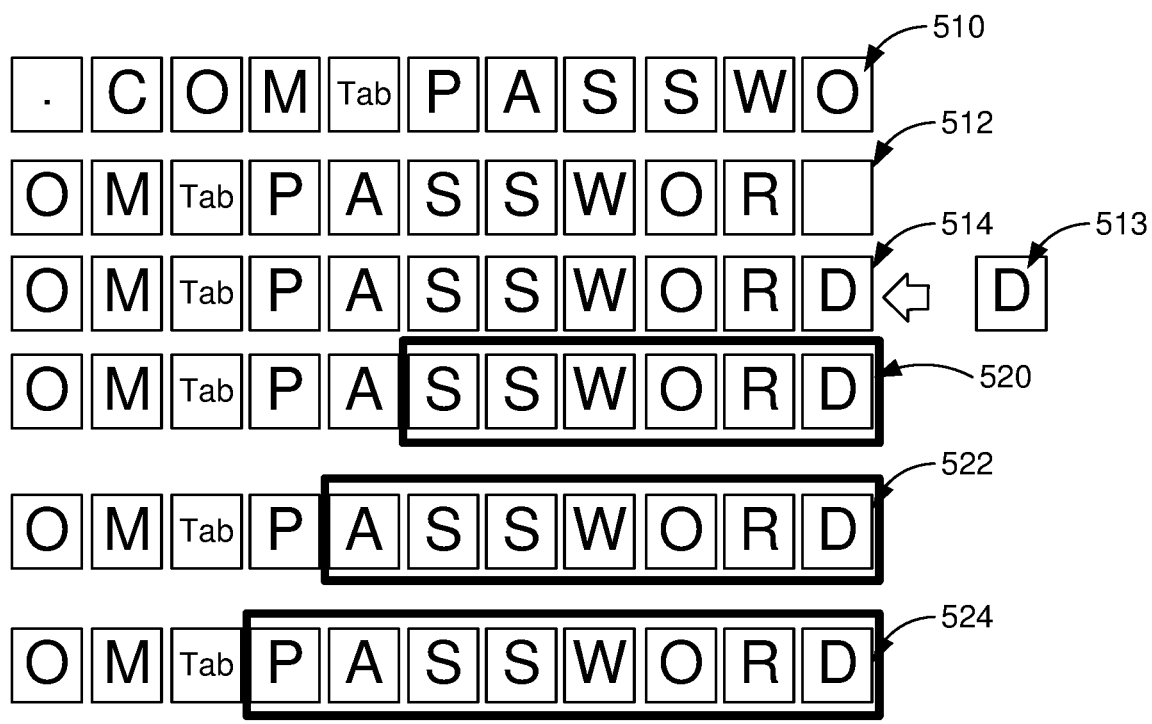
FIG. 5 is a diagram illustrating analysis of keystrokes in an input buffer to detect a credential, in accordance with an aspect of the technology described herein.

An exemplary keystroke buffer is shown with reference to FIG. 5. As can be seen, the keystroke buffer stores the last 11 characters received. Aspects of the technology can work with buffers of different sizes. In aspects, the buffer holds as many or more keystrokes as are in the longest credential being monitored. With each new keystroke, the content of the buffer is updated to include the most recent stroke and remove the oldest. At a first point in time, the first content 510 starts with a period and ends with the letter "o." At a second point in time, the second content 512 starts with an "o" and ends with a space. This content reflects the user entering the keystrokes "r" and space causing the period and "c" to be removed. At a third point in time, the third content 514 reflects the entry of the backspace key to delete the space and the insertion of a "d." This illustrates a special case of keystroke buffer management involving the backspace key. When the backspace key is pressed the last letter entered is deleted but the backspace itself is not entered as a keystroke into the keystroke buffer. Other control keys, such as shift, cap lock, and the like may be omitted from inclusion in the buffer.

In FIG. 4, a keystroke hash is generated from the keystroke buffer and compared to a hash of one or more credentials. Alternatively or additionally, a hash of a partial keyword may be compared to a hash for the keystroke buffer. In both instances, the hash is generated from the same number of characters. For example, if the password contains eight characters then a hash of eight characters from the keystroke buffer should be compared to a hash of the password. Both hashes may be generated using the same function. The partial hash of six characters from the password should be compared with a hash of six keystrokes from the buffer. These options are illustrated again with reference to FIG. 5, where a first hash 520 of the last six strokes is generated. A second hash 522 of the last seven strokes is also generated along with a third hash 524 of the last eight strokes. These three hashes could be compared against hashes of different credentials and/or partial credentials. When a match between a hash from the keystroke buffer and a hash of a credential match, then a credential entry event is identified and threat assessment triggered. Various threat assessments are illustrated subsequently with reference to FIGS. 10-16.

Threat assessment functions may cooperate with the LSASS 234 and SmartScreen 239. Initially, the keystroke is communicated to a secret filter, which may be part of the LSASS 234. The secret filter compares a keystroke hash to a credential hash and determines whether a credential has been typed. When a credential is recognized, then a threat assessment is performed by the threat assessment engine.

The threat assessment engine uses the application context and network context, among other data, to identify a threat or lack thereof. A network sensor may receive network status information from a kernel network sensor and possibly other operating system components. The network status information may include the URL, an IP address, a process ID, a SNI, domain information (e.g., domain name), and other characteristics of the ongoing communication sessions between outside resources.

The application context sensor retrieves state information for the application into which the credential is being entered. The application context sensor can perform process mapping to determine which processes are involved with the threat. For example, the application context sensor can map detected inputs (e.g., keystrokes) to network connections. Input entry may occur in one process and flow through the web via the same process or an entirely different process (e.g., a network broker process). The application context sensors provide insights into this flow to identify the set of relevant network connections. Once the relevant network connections are identified, the network context can be built using these connections. The insights identified by the application context sensors include, but are not limited to, a process tree, an application process model, inter process communication, API surface, process launch command line arguments, process invocation source (i.e. launched by file manager, another app like outlook, etc.), associated I/O handles, and function call stacks.

In another mapping example, the application context sensor can map input to known safe patterns to uncover potentially unsafe cases. Legitimate credential entry for a given application typically occurs according to a well-known pattern where a deviation from said pattern may indicate an unsafe behavior. For example, credential entry in a word processing application should occur in a credential-dialog-box process or a login page hosted within a Web View process. All other credential entry is potentially unsafe. For example, credential entry into the process that hosts the document body implies password caching. Similar safe/unsafe patterns exist for messaging apps (i.e. the safe credential entry through a dialog hosted within a WebView process vs. a chat window process). The function call stack can also be used to determine safe/unsafe contexts. An observed function call stack associated with how an application typically requests credentials (i.e. function foo invokes function foobar) may be classified as safe. Any other call stack may be unsafe.

The application context data store stores information about threatening and non-threatening application contexts. For example, the application-context data store may store application contexts where entry of a password is expected. If the password is being entered and the application context does not match a context where the password entry is expected then a threat detection may result, depending on other factors considered. The data collection manager gathers application and network context data and may pre-process it into a format suitable for the analysis engine. A session manager oversees the threat detection and passes the application context, network context, and credential detected to the analysis engine. The analysis engine determines whether a threat is present. In one aspect, the threat is detected by analyzing a series of rules that define threats. These rules may result in assignment of a classification to the detected credential entry. Among other possible classifications, the threat assessment may classify the credential input as a valid/invalid location, safe/unsafe application, invalid certificate, password reuse, untrusted, known malicious and unknown.

As used herein, a valid location classification is assigned when a credential matches the appropriate identity providers and authentication servers used by an organization associated with the credential. For example, login.microsoft.com is associated with MICROSOFT. When a credential associated with the user's MICROSOFT account is entered when the network context shows the credential is being communicated to login.microsoft.com then the credential entry event may be classified as a valid location. If the network context shows a URL, or other characteristic, that is not associated with the credential's organization then the location may be classified as invalid. An invalid classification may trigger a mitigation action, such as blocking communication of the credential to the URL or suspension of the credential.

As used herein, a safe/unsafe app is the application where the password/credential entry was detected is safe or unsafe for typing plain-text passwords. The application in question may be the active application to which the credential is addressed. The operating system is capable of determining which application is receiving an input. Some applications may be classified as unsafe for all passwords because it is known to be used in phishing attacks or otherwise classified as unsecure.

As used herein, an invalid certificate classification occurs when a location that is not known to be bad has an invalid certificate, which may indicate a potential man in the middle attack. For example, the location could be a trusted website. The certificate may be part of the network context.

As used herein, password reuse occurs when a password registered with a first organization is entered to logon to a trusted site of a different organization. For example, using a MICROSOFT credential to login to Facebook.com may be password reuse. In this scenario, the user may have chosen the same password for two different accounts, which is an unsafe practice. Many organizations have policies that prohibit employees from using the organization password for other accounts. Detection of password reuse may result in a notification being communicated to the user and/or the organization. Suspension of the password is another possible mitigation in response to detecting password reuse. Password reuse, as used herein, is different from password history enforcement, which may prevent a user from using the same password twice on a single system at different times. For example, a system that requires new passwords every month may prevent the user from reusing a password previously used on the system. Pass reuse, as used herein, detects use of a single password on two different systems (e.g., work account and social media account).

As used herein, an untrusted classification may be assigned when a password is entered on an untrusted site (as indicated by a source that tracks known phishing sites and/or sites that pose a security risk). SmartScreen is one example of a component an operating system may use to store information about trusted and untrusted sites.

As used herein, a known malicious classification may be assigned when a password is entered on a known malicious site (as indicated by a source that tracks known phishing sites and/or sites that pose a security risk).

As used herein, an unknown classification may be assigned when a password entry does not fit into any of available classifications. The unknown classification may also be used when two or more of the classifications apply. For example, if there are two network connections and the assessment of one results in untrusted while the other results in password reuse.

When a threat is detected, the existence of a threat may be communicated to one or more components or entities. These may include mitigation components, UI components, the user, cloud-based enterprise security, system administrators, and the like.

Figure 6:
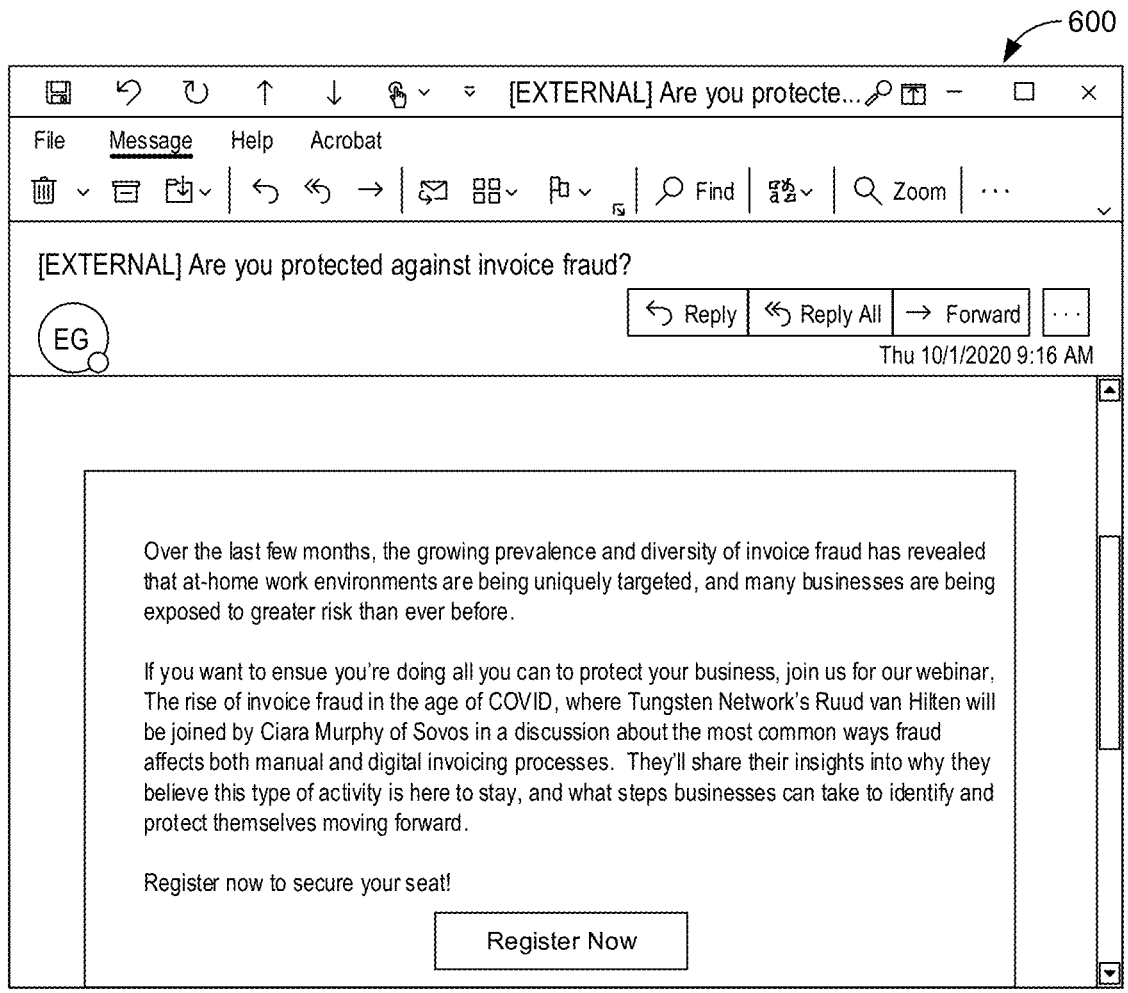
FIG. 6-8 are diagrams showing user interfaces during a phishing attempt.
Figure 7:
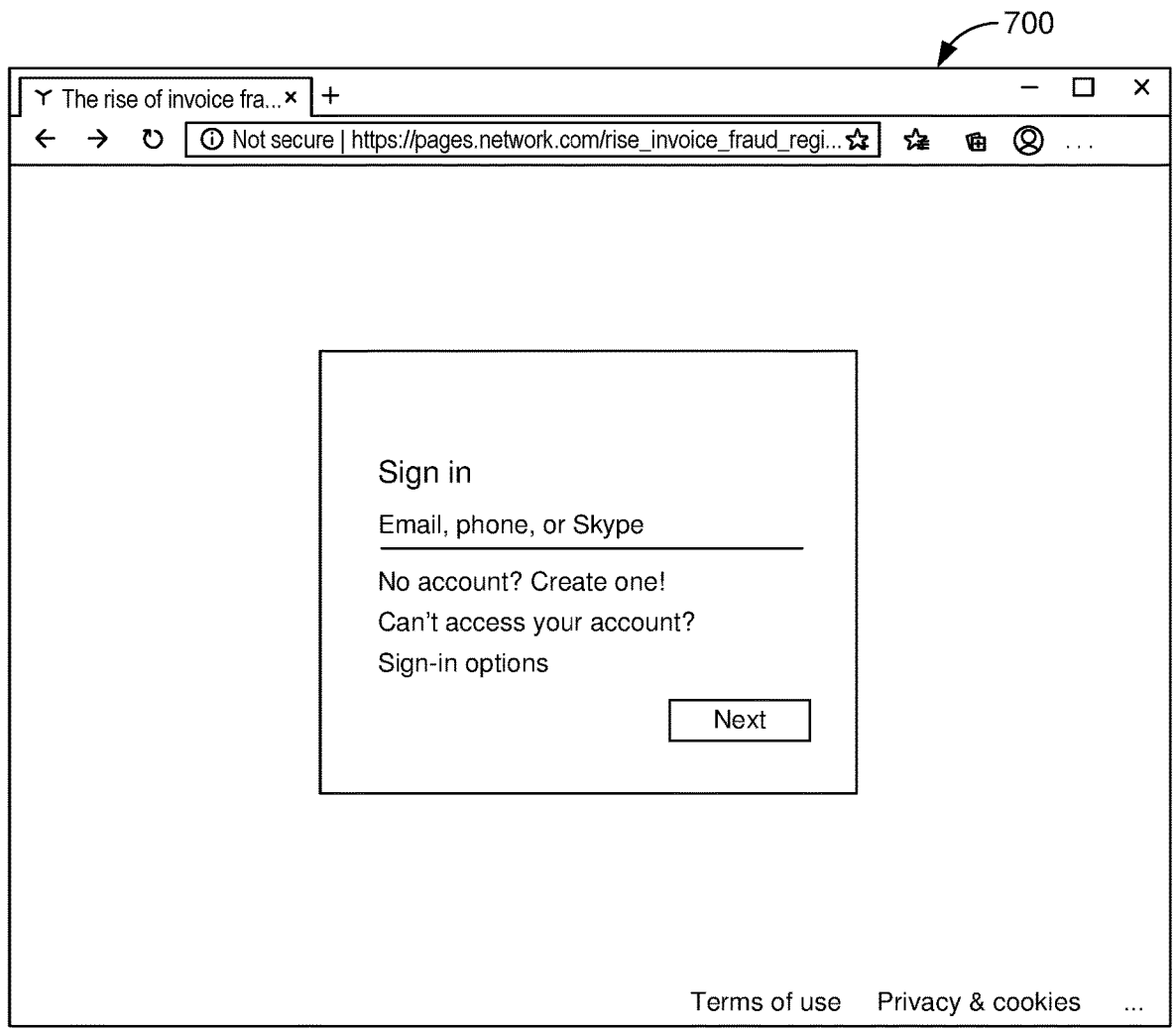
Figure 8:
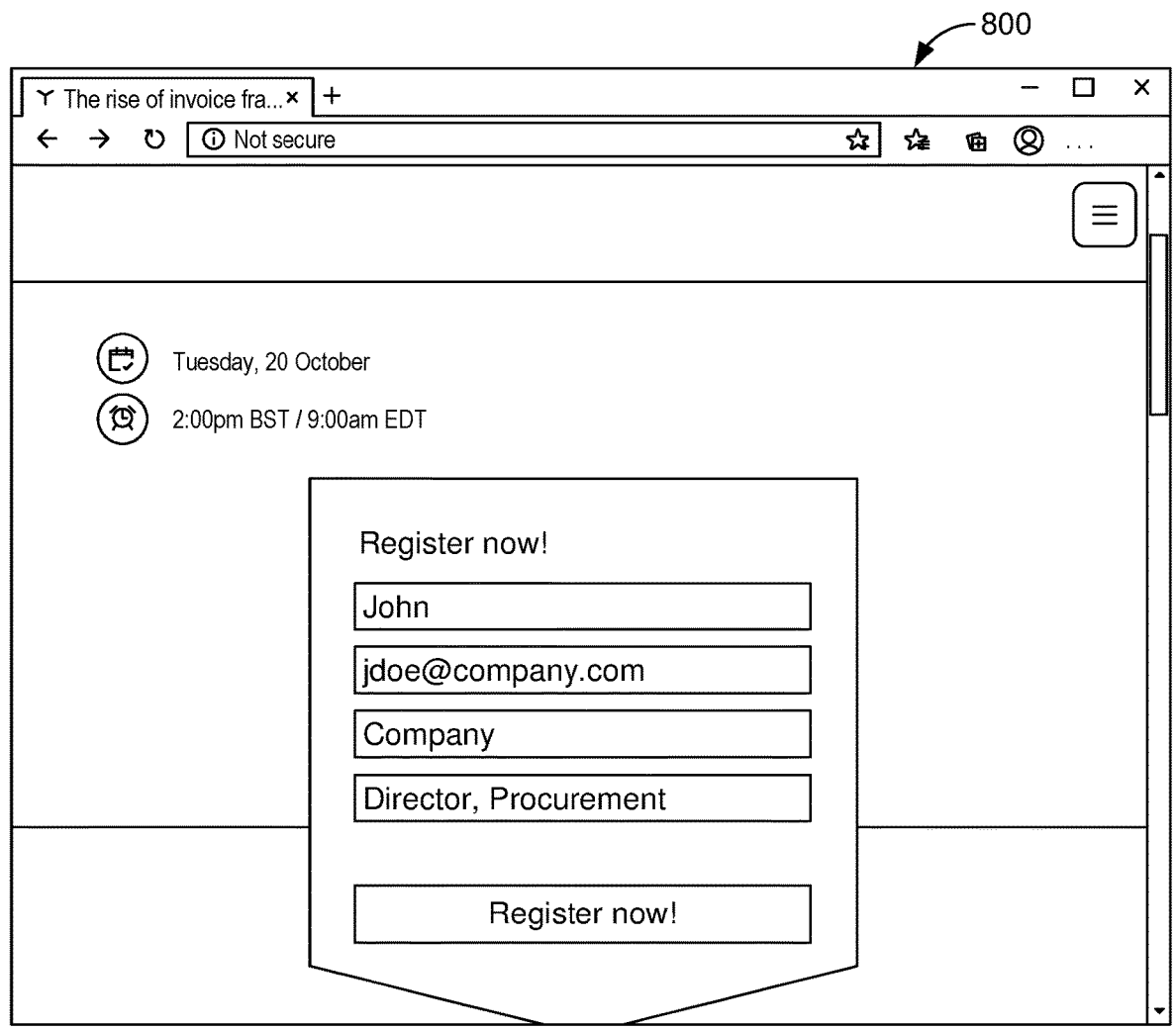

FIGS. 6, 7, and 8, illustrate a phishing attack that can be detected by the technology described herein. In FIG. 6, the user clicks on a register now link in an email 600 from a legitimate business. Initially, a phishing page 700 opens in FIG. 7 asking for the MICROSOFT credentials. On a second load shown in FIG. 8, the legitimate page 800 opens. This situation may be caused by the trusted company being compromised. A hacker may exploit an A/B testing feature, used by webpage analytics to test different versions of a webpage, to present a phishing page. The technology described herein could identify this attack because the MICROSOFT account password should not be associated with the trusted webpage. The network context of the browser would show the trusted URL, but this URL would not match a network context associated with the monitored credential. Note also that the browser state may also fail to match an expected state for entry of the monitored credential. A typical security application might miss this attack because the site certificates could appear to be in order. Further, the security application might not understand which password goes with which service or application. Many security services would not recognize that the password (or other credential) had even been entered.

Figure 9:
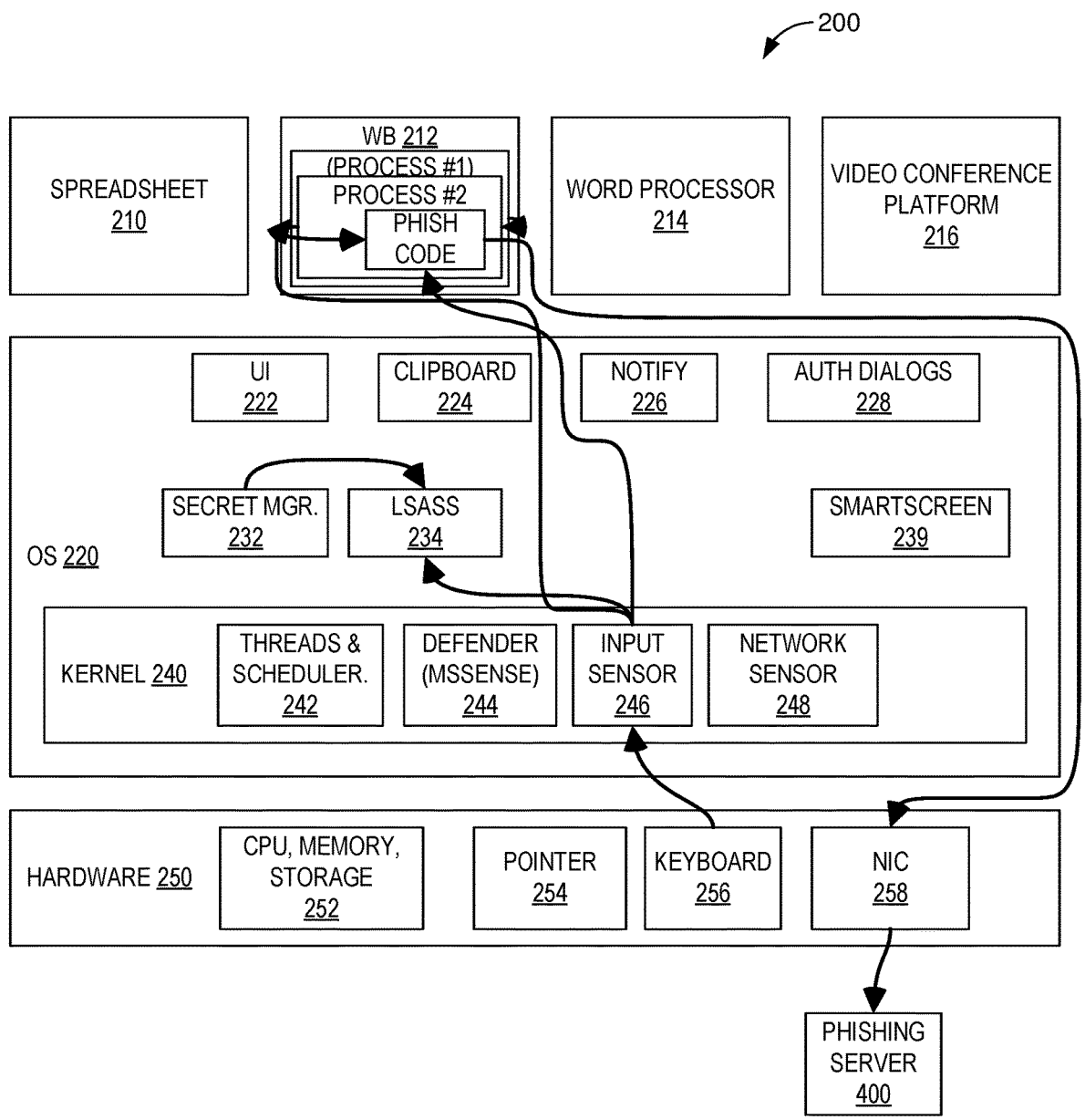
FIG. 9 is a block diagram illustrating activities of components used to detect a phishing website, in accordance with an aspect of the technology described herein.

Turning now to FIG. 9, the detection of a phishing website is illustrated. Initially, a series of keystrokes are communicated to the LSASS 234, where the password entry is identified in conjunction with other components, such as the SmartScreen component. As can be seen, the active application is the web browser 212. When the password entry is detected, a threat assessment is performed. The web browser has two processes running. The first process may be a legitimate process that is not a security threat. The second process has injected phishing code in the input may be communicated to both processes.

The network context may be determined for both processes but the network communications from the phishing code are shown. These communications which are directed to the phishing server 400 define, at least part, of the network context. The threat assessment engine may determine that the network address has been associated with a known phishing entity. Because part of the network context involves the address of a known phishing entity, the password entry can be identified as a threat. Note that the phishing code in process to may have already fooled a security function running in the web browser. The web browser may not be able to determine the entire network context for the computing device. With the technology described herein, because the network sensor at the operating system level is able to determine the entire network context for the device and identify some network traffic being directed to the phishing component 400. Even if the phishing server 400 had not been on a list of known phishing servers, the threat still could be detected if the network context did not match the expected context for entry of the detected credential. The full context for entry of the detected credential could also include the application context of the web browser, which includes the page being displayed or application being run.

Figure 10:
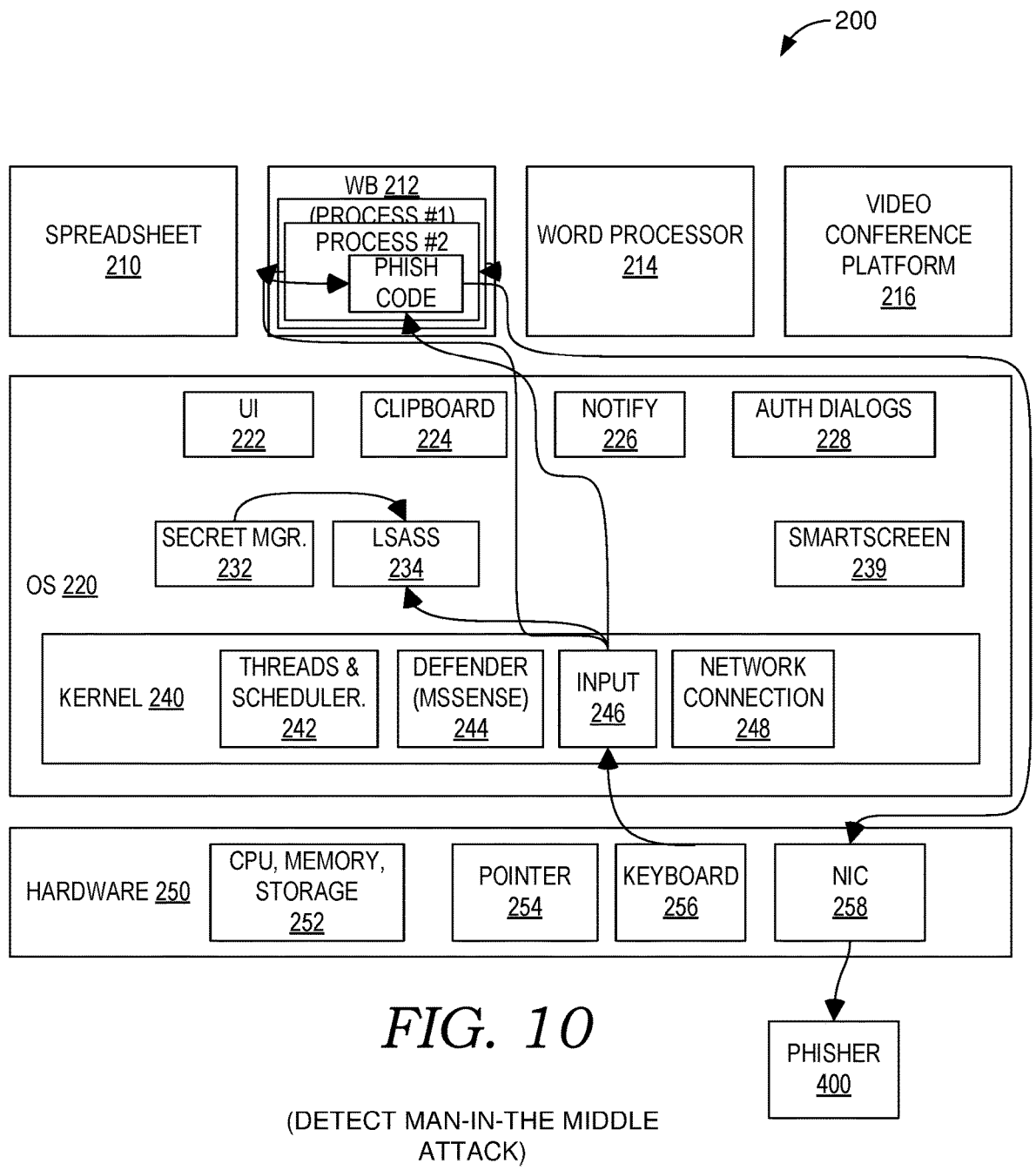
FIG. 10 is a block diagram illustrating activities of components used to detect a man-in-the-middle attack, in accordance with an aspect of the technology described herein.

Turning now to FIG. 10, the detection of a man in the middle attack is illustrated. A man-in-the-middle attack requires a victim, the entity with which the victim is trying to communicate, and the "man in the middle," who is intercepting the victim's communications. The victim is not aware of the man in the middle. With a man-in-the-browser attack (MITB), an attacker needs a way to inject malicious software, or malware, into the victim's computer or mobile device. By clicking on a link or opening an attachment in the phishing message, the user can unwittingly load malware onto their device. The malware then installs itself on the browser without the user's knowledge. The malware records the data sent between the victim and specific targeted websites, such as financial institutions, and transmits it to the attacker. The malware in this scenario is the phish code loaded into the browser.

Initially, a series of keystrokes are communicated to the LSASS 234, where the password entry is identified in conjunction with other components, such as the SmartScreen component. As can be seen, the active application is the web browser 212. The arrangement and communications in FIG. 10 are similar to those in FIG. 9, except that in FIG. 9 the attack was based on a phishing website. In FIG. 10, the website is safe, but malware code in the browser copies keystrokes and sends it to a destination, the phishing server 400, that is not appropriate for the application context and could also be on an identified phishing list.

Figure 11:
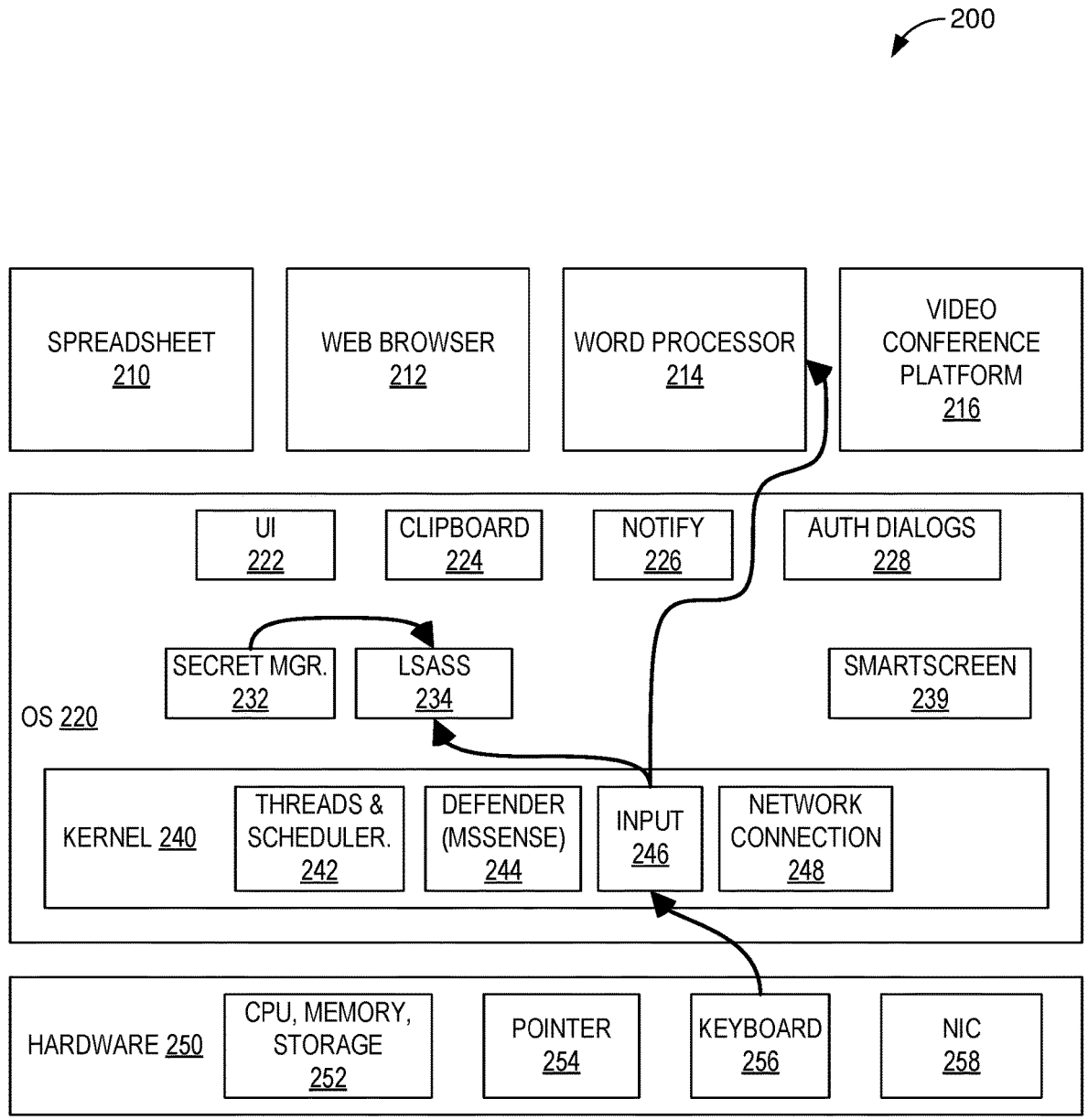
FIG. 11 is a block diagram illustrating activities of components used to detect a phishing attempt through a word processor application, in accordance with an aspect of the technology described herein.

Turning now to FIG. 11, the detection of a phishing attack in a document is illustrated. Initially, a series of keystrokes are communicated to the LSASS 234, where the password entry is identified in conjunction with other components, such as the SmartScreen component. As can be seen, the active application is the word processor 214. In this scenario, a network context may not be involved. Simply detecting the user entering a password in a document, even as plain text may be enough to identify a threat. In other words, no context for the application may exist where entry of a password is appropriate. In other situations, such as when the application is provided as a service, then entry of a password may be appropriate in certain contexts. In these situations, the stored application state consistent with password entry can be compared with the actual state when the password is entered to determine whether a threat is present. In some cases, this might just be a bad safety practice by the user, rather than a phishing attack. However, phishing attacks can occur through documents and other files that have macros that generate a phishing interface. The interface may ask for a credential to open the document or take some other action. The macro can collect the credential and communicate it via email or some other method.

Figure 12:
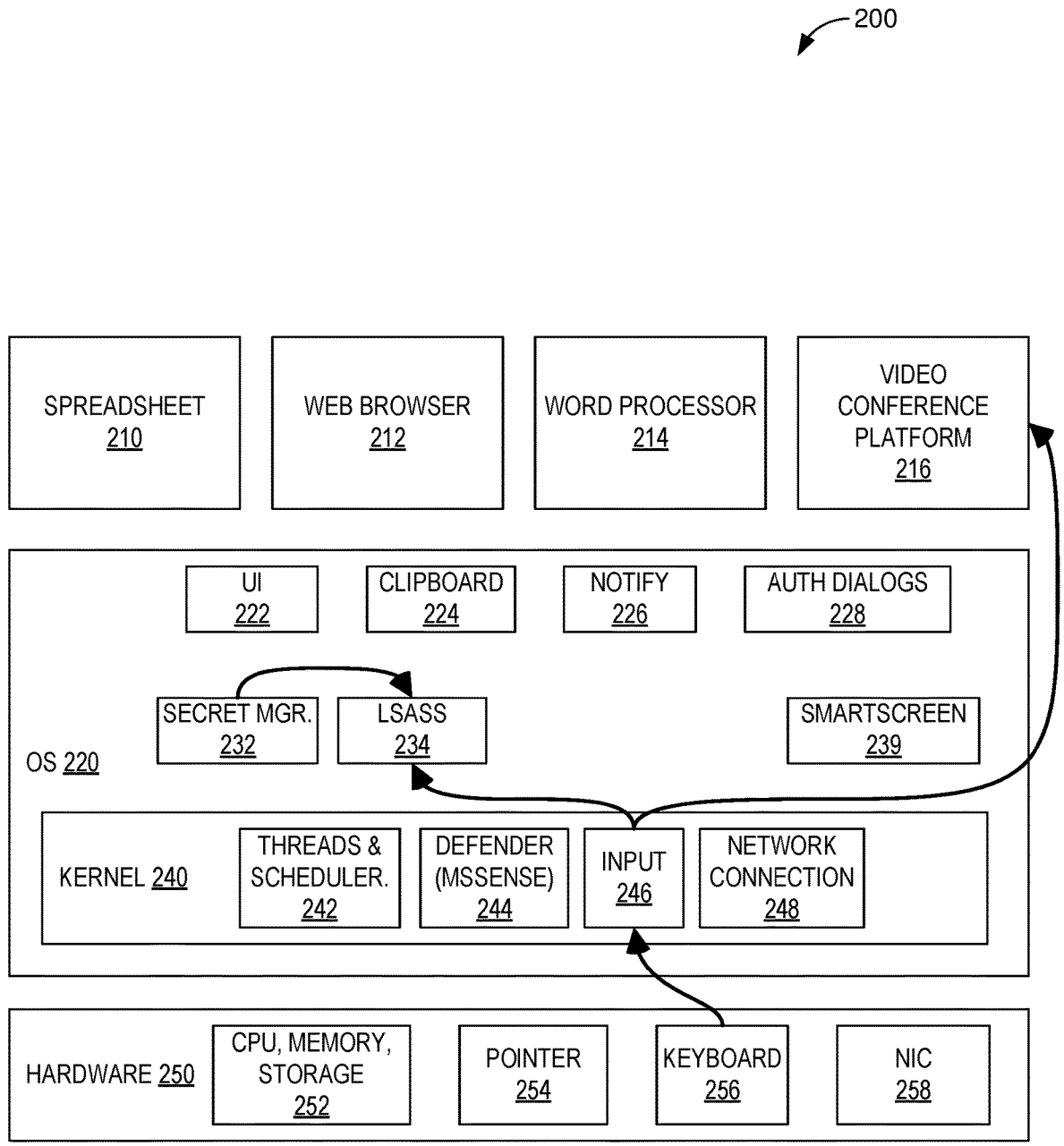
FIG. 12 is a block diagram illustrating activities of components used to detect a phishing attack through a video conference platform, in accordance with an aspect of the technology described herein.

Turning now to FIG. 12, the detection of a phishing attack in a video platform is illustrated. Initially, a series of keystrokes are communicated to the LSASS 234, where the password entry is identified in conjunction with other components, such as the SmartScreen component. As can be seen, the active application is the video conference platform 216. In this scenario, a network context may not be involved. Simply detecting the user entering a password in a chat may be enough to identify a threat. In other words, no context for the application may exist where entry of a password is appropriate. In other situations, such as when the application is provided as a service, then entry of a password may be appropriate in certain contexts. In these situations, the stored application state consistent with password entry can be compared with the actual state when the password is entered to determine whether a threat is present. In some cases, this might just be a bad safety practice by the user, rather than a phishing attack. However, phishing attacks can occur through video chats, such as when an entity is posing a technical support. Macros on the platform could also generate interfaces that ask for a password. The interface may ask for a credential to join a meeting, make a recording, or take some other action. The macro can collect the credential and communicate it via email or some other method.

Figure 13:
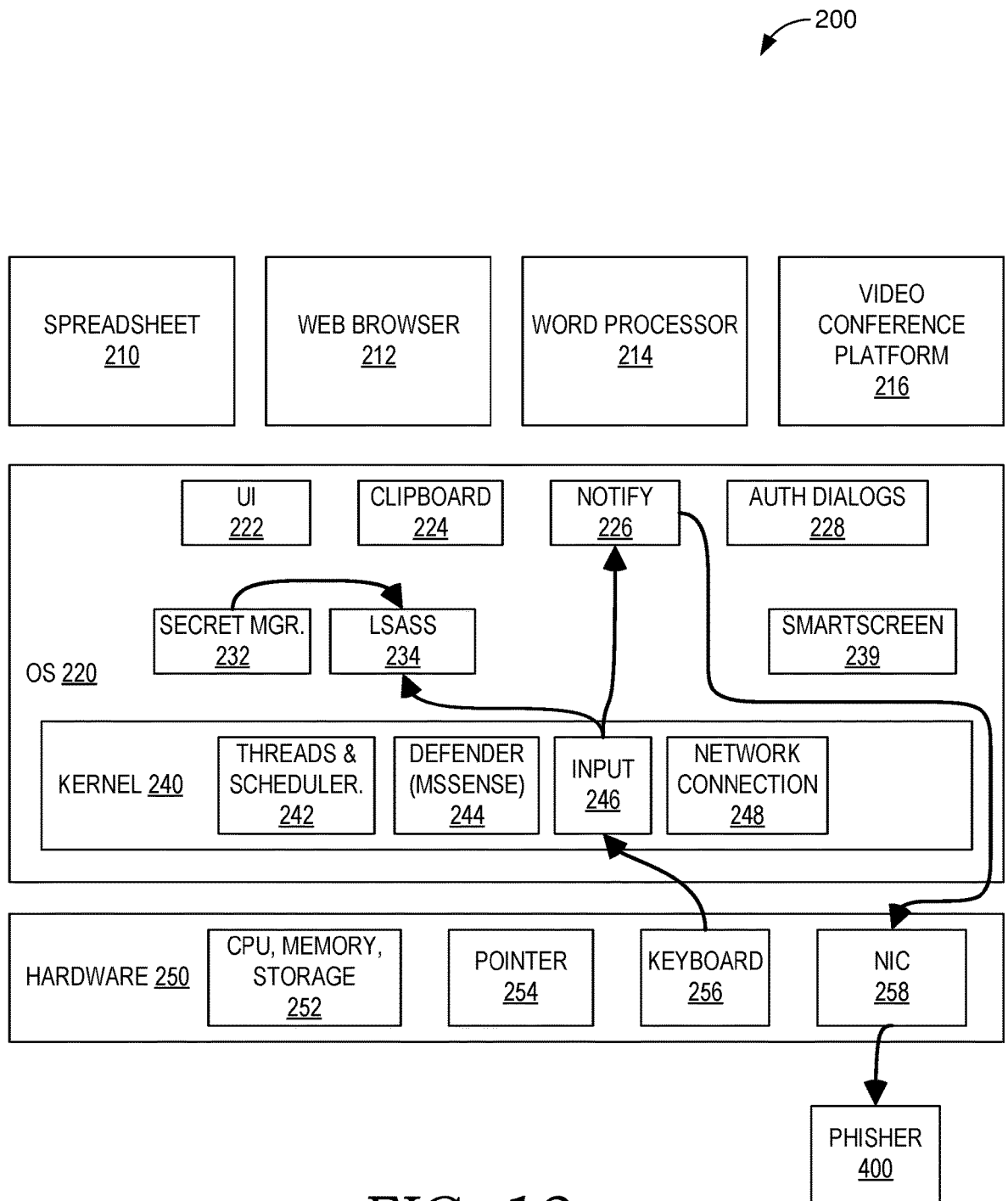
FIG. 13 is a block diagram illustrating activities of components used to detect a phishing attack through an operating system notification, in accordance with an aspect of the technology described herein.

Turning now to FIG. 13, the detection of a phishing attack in an operating system notification is illustrated. Initially, a series of keystrokes are communicated to the LSASS 234, where the password entry is identified in conjunction with other components, such as the SmartScreen component. As can be seen, the active function is the operating system notification function 226. Some legitimate notifications may ask the user to enter credentials, for example, after the token generated by a previous password entry expired. The network context may be determined. Notice that communications directed to the phishing server 400 define, at least, part of the network context. The threat assessment engine may determine that the network address has been associated with a known phishing entity. Because part of the network context involves the address of a known phishing entity, the password entry can be identified as a threat. With the technology described herein, because the network sensor at the operating system level is able to determine the entire network context for the device and identify some network traffic being directed to the phishing component 400. This allows the phishing attempt to be correctly identified and mitigated. Even if the phishing server 400 had not been on a list of known phishing servers, the threat still could be detected if the network context did not match the expected context for entry of the detected credential. The full context for entry of the detected credential could also include the application context of the notification, which includes the application that requested or triggered the notification.

Figure 14:
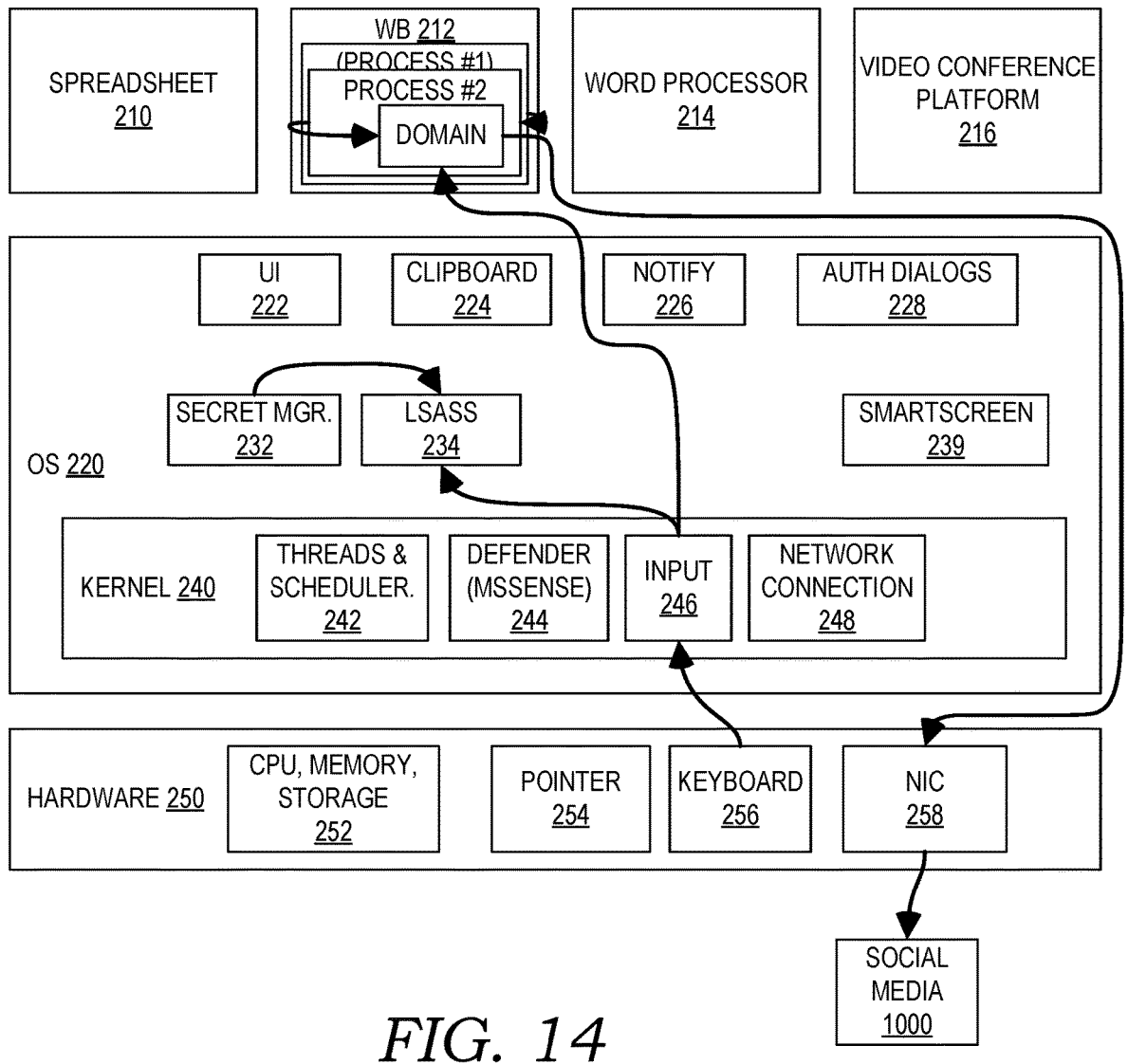
FIG. 14 is a block diagram illustrating activities of components used to detect password reuse, in accordance with an aspect of the technology described herein.

Turning now to FIG. 14, the detection of password reuse is illustrated. Initially, a series of keystrokes are communicated to the LSASS 234, where the password entry is identified in conjunction with other components, such as the SmartScreen component. As can be seen, the active application is the web browser 212. When the password entry is detected, a threat assessment is performed. The web browser has two processes running, but in this case both are legitimate.

The network context may be determined for both processes. The threat assessment engine may identify the network address is from a trusted source, but not a trusted source associated with the password. This may indicate password reuse, which occurs when a person uses the same password with multiple accounts. In this case, a mitigation step could include notifying the user and a system administrator.

Figure 15:
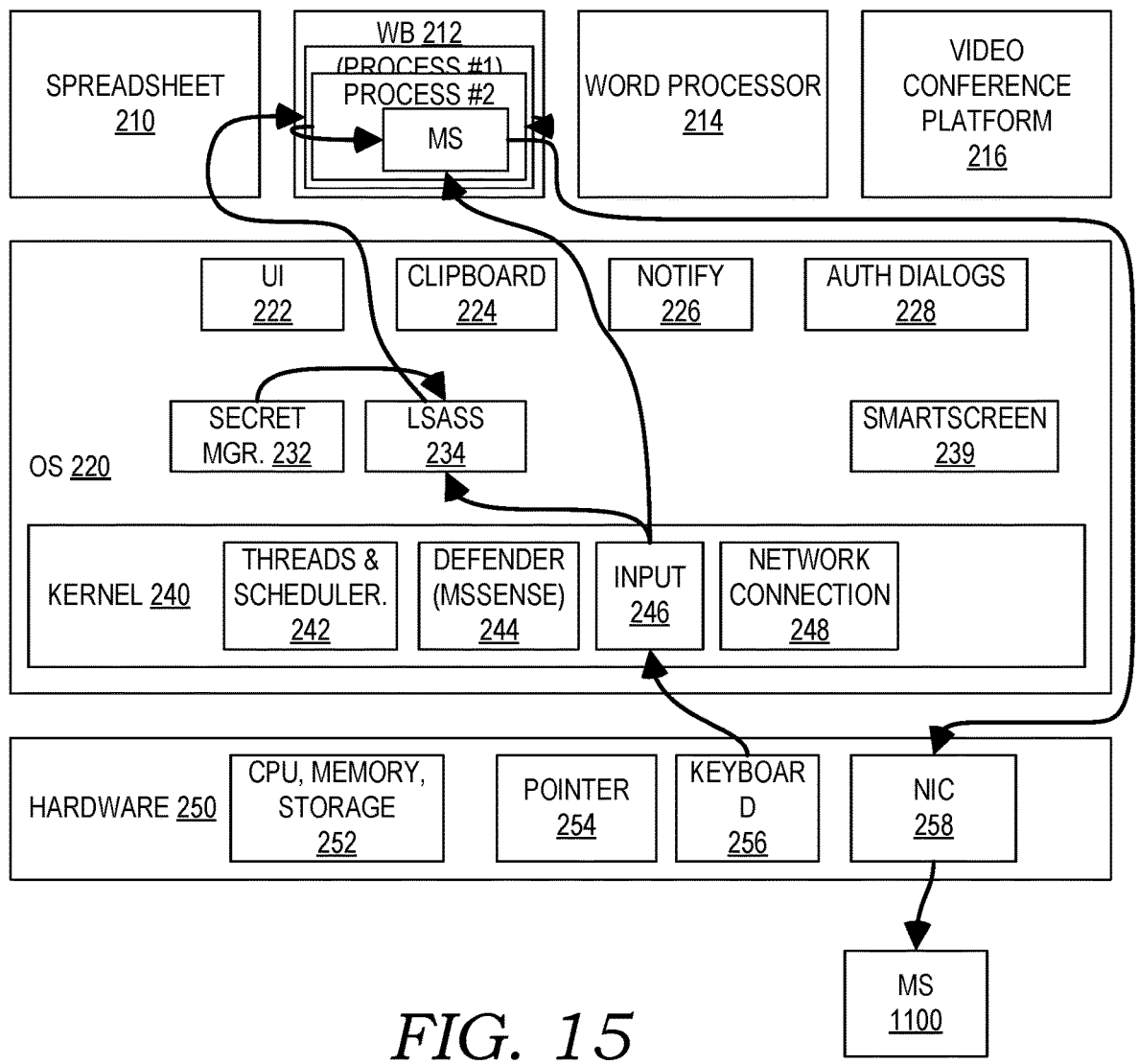
FIG. 15 is a block diagram illustrating activities of components used to confirm correct password use, in accordance with an aspect of the technology described herein.

Turning now to FIG. 15, the detection of non-threatening password use is illustrated. Initially, a series of keystrokes are communicated to the LSASS 234, where the password entry is identified in conjunction with other components, such as the SmartScreen component. As can be seen, the active application is the web browser 212. When the password entry is detected, a threat assessment is performed. The web browser has two processes running, but in this case, both are connected to legitimate authentication sites.

The network context may be determined for both processes. The threat assessment engine may identify the network address is from a trusted source, that is the source expected to be used with the password. In this situation, no mitigation needs to be taken, but application and network context may be gathered to help refine the correct network and application context for use of the password.

Exemplary Methods

Figure 16:
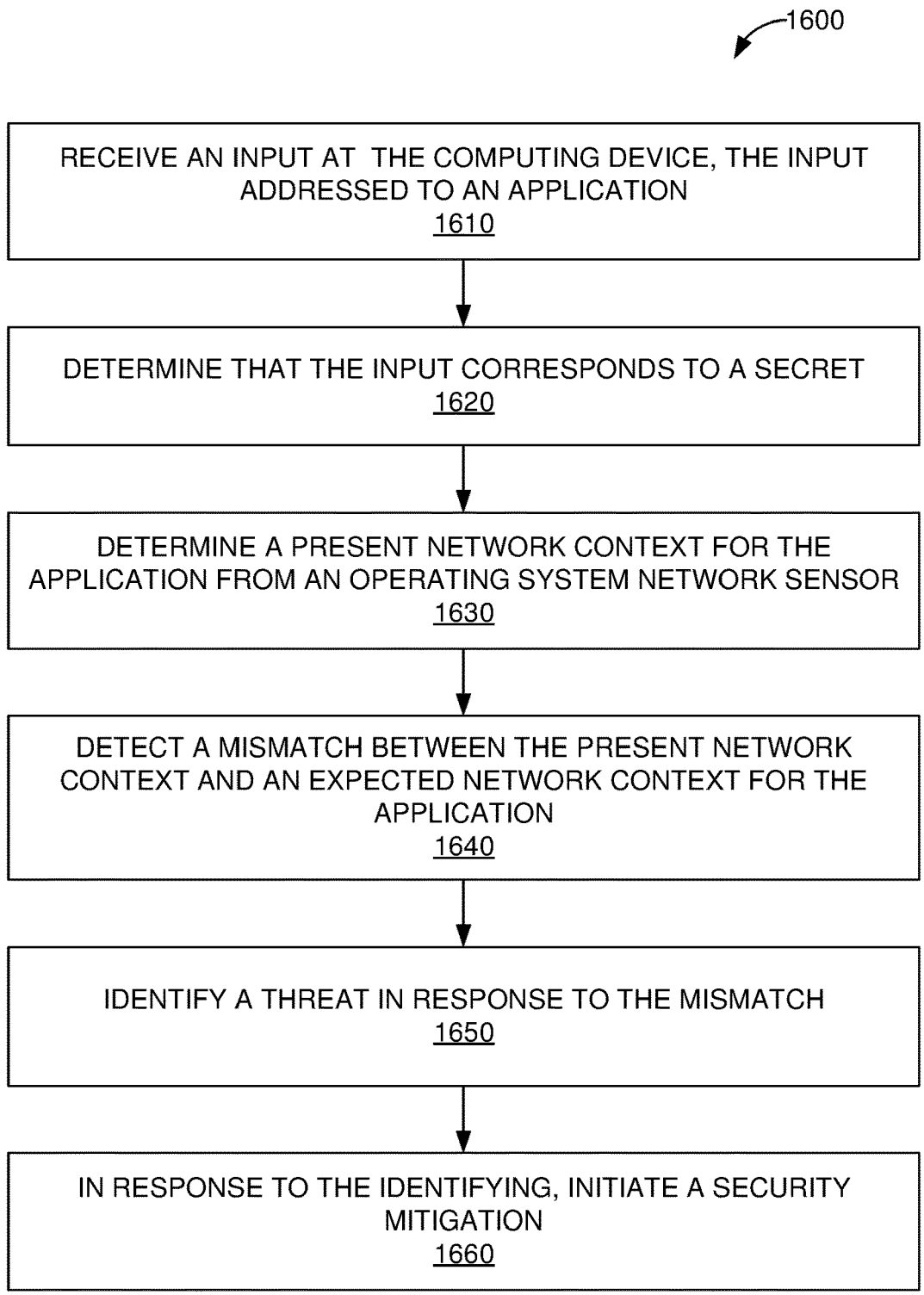
FIG. 16 is a flow diagram showing a method of detecting an analyzing a credential input, in accordance with an aspect of the technology described herein.
Figure 18:
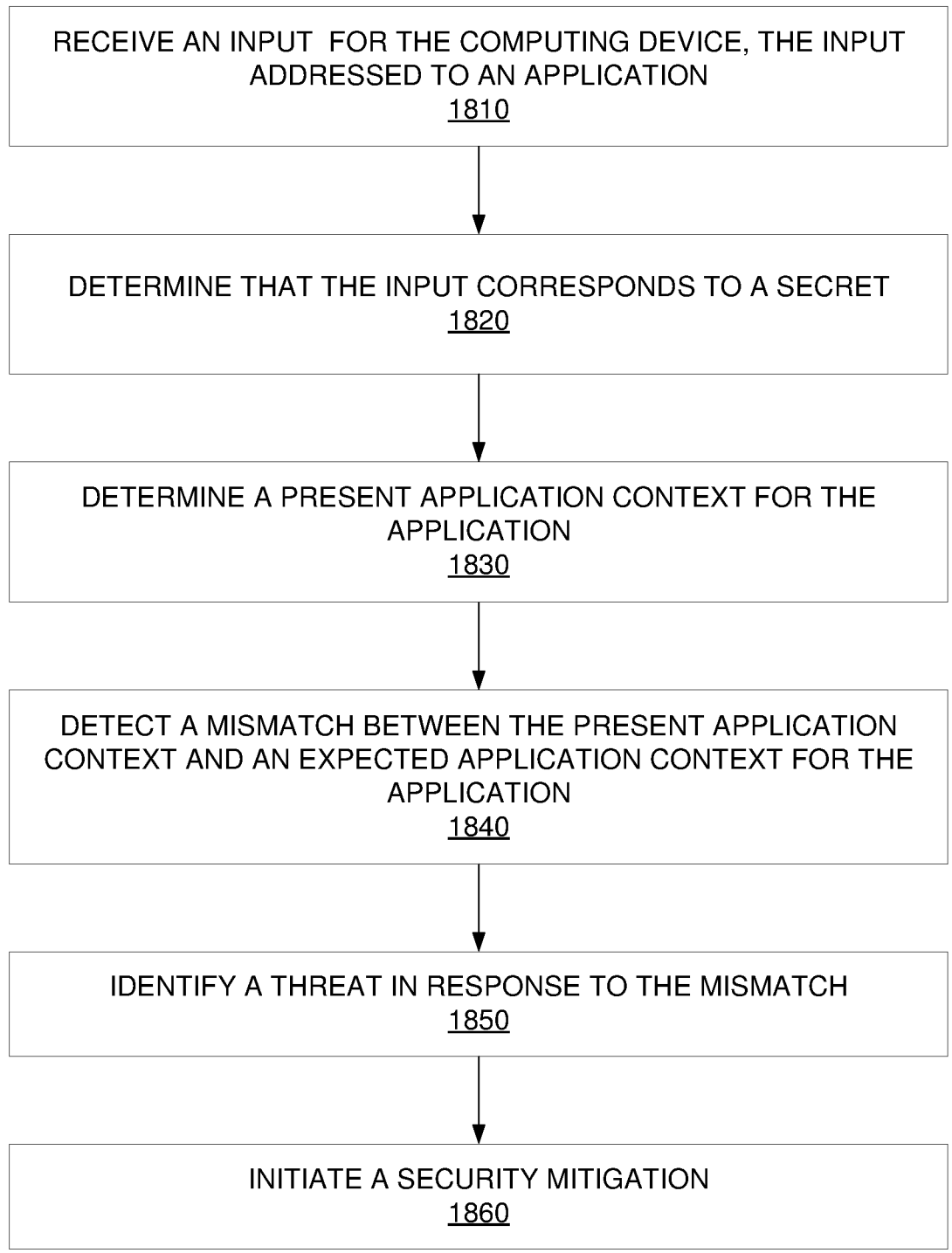
FIG. 18 is a flow diagram showing a method of detecting an analyzing a credential input, in accordance with an aspect of the technology described herein.
Figure 19:
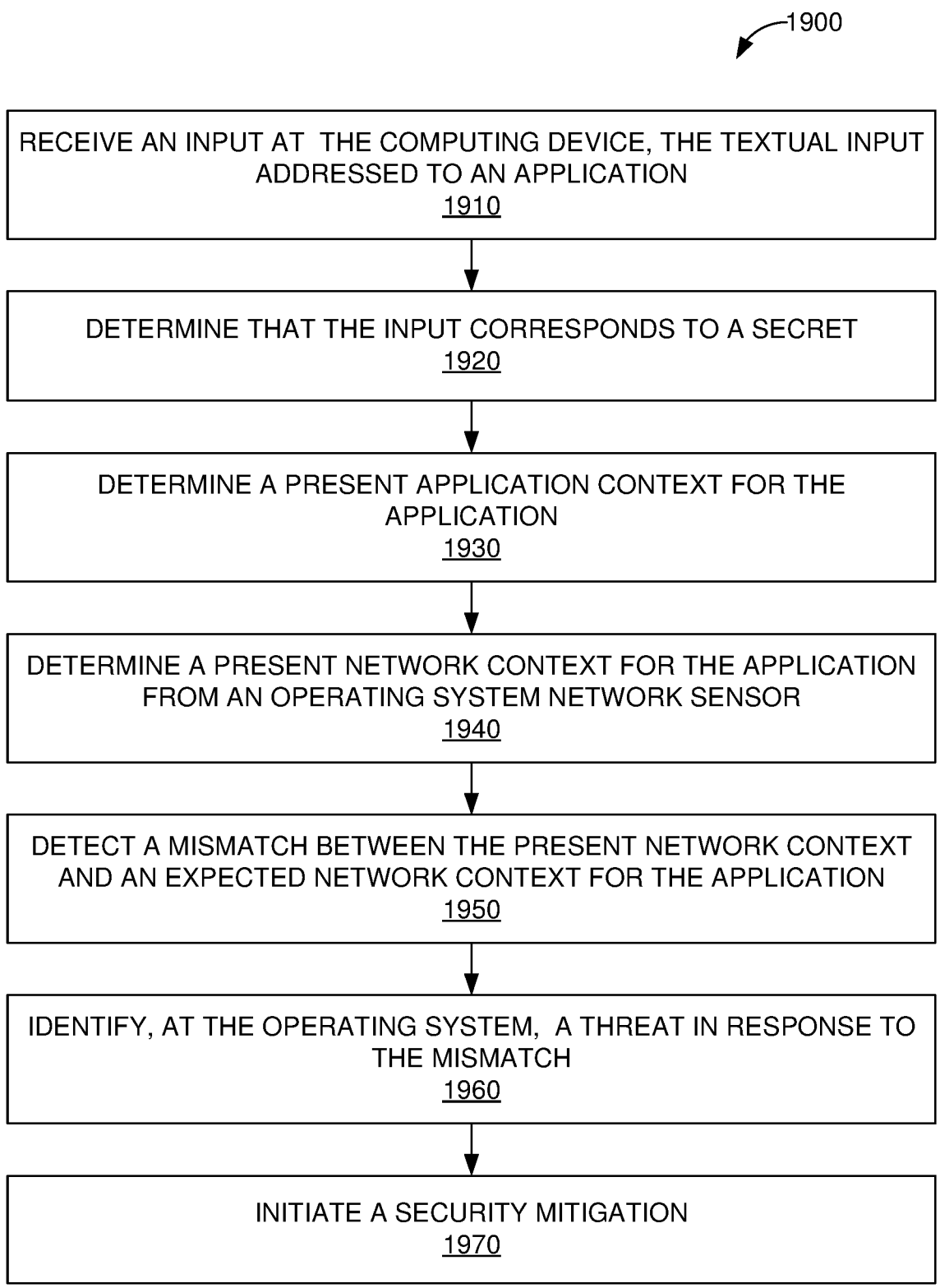
FIG. 19 is a flow diagram showing a method of detecting an analyzing a credential input, in accordance with an aspect of the technology described herein.

Now referring to FIGS. 16, 18 and 19, each block of methods 1600, 1800, and 1900, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by an operating system. In addition, methods 1600, 1800, and 1900 are described, by way of example, with respect to FIGS. 1-15. However, these methods may additionally or alternatively be executed by any one system, or any combination of systems, including, but not limited to, those described herein.

FIG. 16 is a flow diagram showing a method 1600 for detecting an analyzing entry of a credential, in accordance with some embodiments of the present disclosure. Method 1600 could be performed on or with systems similar to those described with reference to FIGS. 1-15. In particular, method 1600 may be performed by one or more operating system components.

The method 1600, at block 1610 includes receiving an input for the computing device. The input may be a textual input comprising characters, numbers, and symbols. In one aspect, a textual input is received from a hard or soft keyboard. The technology described herein identifies and mitigates phishing attempts by analyzing user input received at the operating system level. Analyzing the input as it is received at the operating system level allows for the detection of threats that may not be detected by an analysis of input at the application level. The textual input may be entered through a real or virtual keyboard or through other means (e.g., a gesture interface, speech-to-text). The textual input may be received from a hardware driver for the input device used to originate the characters of the textual input. The textual input is addressed to an application running on the computing system. The textual input may be communicated from the operating system to an application. The textual input is directed to an application, rather than directly to the operating system. The operating system communicates the textual input to the application.

The method 1600, at block 1620 includes determining that the textual input corresponds to a credential. As described previously, this step may be performed by an operating system component. Initially, a credential, such as a username or password, is registered with the threat detection system. Aspects of the technology described herein are not limited for use with a username or password. A credential may be any type of secret or confidential information, such as Social Security numbers, credit card information, driver's license numbers, passport IDs, could be monitored by the system described herein. In one aspect, a username and password for the operating system is automatically registered. A user interface may be provided for a user or other individual (e.g., system administrator) to register additional credentials for monitoring.

The registered credentials are associated with the user in a credential data store, which may be described as a credential manager herein, and may be associated with a local operating system. In one aspect, a hash of the credential is stored rather than the credential. In aspects, a hash of the credential is generated using a first function and stored for comparison with a hash generated from a user input. The technology described herein will perform a threat assessment when a credential entry is detected, without the credential or credential hash leaving the local operating system.

The technology described herein intercepts user input at the operating system level, generates a hash of the input, and compares it with a hash of a credential being monitored. In one aspect, a hash of the last n characters received is generated where n is the character length of the credential. For example, a hash of the last eight characters entered may be generated and compared to a hash of an eight-character password. In another aspect, hashes of less than the full credential are generated and used to detect potential entry of a credential before the entry is complete. For example, a hash of four characters, five characters, six characters and seven characters could be generated in order to anticipate the entry of an eight-character password. In this scenario, the input strings are hashed at the character lengths that match hashes of partial credentials stored in the credential manager.

A credential entry is detected when a hash for the character string entered matches a hash for a credential being monitored. A potential credential entry is detected when a hash of the character string entered matches a hash for a partial credential.

The method 1600, at block 1630 includes determining a present network context for the application from an operating system network sensor. As described previously, this step may be performed by an operating system component. A network sensor may receive network status information from a kernel network sensor and possibly other operating system components. The network status information may include the URL, an IP address, a process ID, a SNI, domain information (e.g., domain name), and other characteristics of the ongoing communication sessions between outside resources.

The method 1600, at block 1640 includes detecting a mismatch between the present network context and an expected network context for the application. As described previously, this step may be performed by an operating system component. One or more attributes of the present network context and the expected network context may be compared to detect the mismatch.

The method 1600, at block 1650 includes identifying, at the operating system, a threat in response to the mismatch between the present network context and an expected network context for the application. In this case, the mismatch can mean the credential entry is not being completed in a normal context. The abnormal context indicates a threat to the security or confidentiality of the credential. As described previously, this step may be performed by an operating system component. In one aspect, the threat is detected by analyzing a series of rules that define threats. These rules may result in assignment of a classification to the detected credential entry. Among other possible classifications, the threat assessment may classify the credential input as a valid/invalid location, safe/unsafe application, invalid certificate, password reuse, untrusted, known malicious and unknown.

The method 1600, at block 1660 includes in response to the identifying, initiating security mitigation. As described previously, this step may be performed by an operating system component. Various mitigation actions may be taken when a threat is detected. A threat classification may trigger a mitigation action, such as blocking communication of the credential to the URL or suspension of the credential. A user and/or system administrator may specify the mitigation action taken when a threat is detected. Different mitigation actions may be specified for different threat classifications. One type of mitigation is threat reporting. Useful sensor data and telemetry may be sent to a cloud protection service associated with the operating system vendor, to a system administrator associated with an organization (e.g., employer) managing the computing device. The same information may be made accessible to a user of the device being monitored. Phishing determinations may also be shared (considering all compliance and privacy guidelines) with a centralized threat protection service that would benefit from leveraging the phishing data to better protect customers from phishing.

The mitigation actions can also include user awareness efforts. From the user perspective, the phishing protection may have generic (not application specific) user interfaces that allow for blocking phishing attempts, changing passwords, warning about detected risks, phishing education, and social engineering training. These last two options may appeal to enterprises that would like to deliver targeted additional security training to end-users. Application specific user interfaces can also be used. The communication of threat detection information could be enabled via a public API.

Detection of password reuse may result in a notification being communicated to the user and/or the organization. Suspension of the password is another possible mitigation in response to detecting password reuse or other threat.

FIG. 18 is a flow diagram showing a method 1800 for detecting an analyzing entry of a credential, in accordance with some embodiments of the present disclosure. Method 1800 could be performed on or with systems similar to those described with reference to FIGS. 1-15. In particular, method 1800 may be performed by one or more operating system components.

The method 1800, at block 1810 includes receiving an input at a computing device. The input may be a textual input comprising characters, numbers, and symbols. In one aspect, a textual input is received from a hard or soft keyboard. The input is addressed to an application. As described previously, this step may be performed by an operating system component. The technology described herein identifies and mitigates phishing attempts by analyzing user input received at the operating system level. Analyzing the input as it is received at the operating system level allows for the detection of threats that may not be detected by an analysis of input at the application level. The textual input may be entered through a real or virtual keyboard or through other means (e.g., a gesture interface, speech-to-text). The textual input may be received from a hardware driver for the input device used to originate the characters of the textual input. The textual input is addressed to an application running on the computing system. The textual input may be communicated from the operating system to an application. The textual input is directed to an application, rather than directly to the operating system. The operating system communicates the textual input to the application.

The method 1800, at block 1820 includes determining that the textual input corresponds to a credential. As described previously, this step may be performed by an operating system component. Initially, a credential, such as a username or password, is registered with the threat detection system. Aspects of the technology described herein are not limited for use with a username or password. A credential may be any type of secret or confidential information, such as Social Security numbers, credit card information, driver's license numbers, passport IDs, could be monitored by the system described herein. In one aspect, a username and password for the operating system is automatically registered. A user interface may be provided for a user or other individual (e.g., system administrator) to register additional credentials for monitoring.

The registered credentials are associated with the user in a credential data store. In aspects, a hash of the credential is generated using a first function and stored for comparison with a hash generated from a user input. The technology described herein intercepts user input at the operating system level, generates a hash of the input, and compares it with a hash of a credential being monitored. In one aspect, a hash of the last n characters received is generated where n is the character length of the credential. For example, a hash of the last eight characters entered may be generated and compared to a hash of an eight-character password. In another aspect, hashes of less than the full credential are generated and used to detect potential entry of a credential before the entry is complete. For example, a hash of four characters, five characters, six characters and seven characters could be generated in order to anticipate the entry of an eight-character password. In this scenario, the input strings are hashed at the character lengths that match hashes of partial credentials stored in the credential manager.

A credential entry is detected when a hash for the character string entered matches a hash for a credential being monitored. A potential credential entry is detected when a hash of the character string entered matches a hash for a partial credential.

The method 1800, at block 1830 includes determining a present application context for the application. As described previously, this step may be performed by an operating system component. The features of the application context include, but are not limited to, a process tree, an application process model, inter process communication, API surface, process launch command line arguments, process invocation source (i.e. launched by file manager, another app like outlook, etc.), associated I/O handles, and function call stacks.

The method 1800, at block 1840 includes detecting a mismatch between the present application context and an expected application context for the application. As described previously, this step may be performed by an operating system component. The mismatch may be detected by comparing one or more attributes of the expected application context to the present application context.

The method 1800, at block 1850 includes identifying a threat in response to the mismatch. In this case, the mismatch can mean the credential entry is not being completed in a normal context. The abnormal context indicates a threat to the security or confidentiality of the credential. As described previously, this step may be performed by an operating system component. In another mapping example, the application context sensor can map input to known safe patterns to uncover potentially unsafe cases. Legitimate credential entry for a given application typically occurs according to a well-known pattern where a deviation from said pattern may indicate an unsafe behavior. For example, credential entry in a word processing application should occur in a credential-dialog-box process or a login page hosted within a WebView process. All other credential entry is potentially unsafe. For example, credential entry into the process that hosts the document body implies password caching. Similar safe/unsafe patterns exist for messaging apps (i.e. the safe credential entry through a dialog hosted within a WebView process vs. a chat window process). The function call stack can also be used to determine safe/unsafe contexts. An observed function call stack associated with how an application typically requests credentials (i.e. function foo invokes function foobar) may be classified as safe. Any other call stack may be unsafe.

An application-context data store may store information about threatening and non-threatening application contexts. For example, the application-context data store may store application contexts where entry of a password is expected. If the password is being entered and the application context does not match a context where the password entry is expected then a threat detection may result, depending on other factors considered. The data collection manager gathers application and network context data and may preprocess it into a format suitable for the analysis engine. In one aspect, the threat is detected by analyzing a series of rules that define threats. These rules may result in assignment of a classification to the detected credential entry. Among other possible classifications, the threat assessment may classify the credential input as a valid/invalid location, safe/unsafe application, invalid certificate, password reuse, untrusted, known malicious and unknown.

The method 1800, at block 1860 includes in response to the identifying, initiating a security mitigation. As described previously, this step may be performed by an operating system component. Various mitigation actions may be taken when a threat is detected. A threat classification may trigger a mitigation action, such as blocking communication of the credential to the URL or suspension of the credential. A user and/or system administrator may specify the mitigation action taken when a threat is detected. Different mitigation actions may be specified for different threat classifications. One type of mitigation is threat reporting. Useful sensor data and telemetry may be sent to a cloud protection service associated with the operating system vendor, to a system administrator associated with an organization (e.g., employer) managing the computing device. The same information may be made accessible to a user of the device being monitored. Phishing determinations may also be shared (considering all compliance and privacy guidelines) with a centralized threat protection service that would benefit from leveraging the phishing data to better protect customers from phishing.

The mitigation actions can also include user awareness efforts. From the user perspective, the phishing protection may have generic (not application specific) user interfaces that allow for blocking phishing attempts, changing passwords, warning about detected risks, phishing education, and social engineering training. These last two options may appeal to enterprises that would like to deliver targeted additional security training to end-users. Application specific user interfaces can also be used. The communication of threat detection information could be enabled via a public API.

Detection of password reuse may result in a notification being communicated to the user and/or the organization. Suspension of the password is another possible mitigation in response to detecting password reuse or other threat.

FIG. 19 is a flow diagram showing a method 1900 for detecting an analyzing entry of a credential, in accordance with some embodiments of the present disclosure. Method 1900 could be performed on or with systems similar to those described with reference to FIGS. 1-15. In particular, method 1900 may be performed by one or more operating system components.

The method 1900, at block 1910 includes receiving an input at a computing device. The input may be a textual input comprising characters, numbers, and symbols. In one aspect, a textual input is received from a hard or soft keyboard. The textual input is addressed to an application. As described previously, this step may be performed by an operating system component. The technology described herein identifies and mitigates phishing attempts by analyzing user input received at the operating system level. Analyzing the input as it is received at the operating system level allows for the detection of threats that may not be detected by an analysis of input at the application level. The textual input may be entered through a real or virtual keyboard or through other means (e.g., a gesture interface, speech-to-text). The textual input may be received from a hardware driver for the input device used to originate the characters of the textual input. The textual input is addressed to an application running on the computing system. The textual input may be communicated from the operating system to an application. The textual input is directed to an application, rather than directly to the operating system. The operating system communicates the textual input to the application.

The method 1900, at block 1920 includes determining that the textual input corresponds to a credential. As described previously, this step may be performed by an operating system component. Aspects of the technology described herein are not limited for use with a username or password. A credential may be any type of secret or confidential information, such as Social Security numbers, credit card information, driver's license numbers, passport IDs, could be monitored by the system described herein. In one aspect, a username and password for the operating system is automatically registered. A user interface may be provided for a user or other individual (e.g., system administrator) to register additional credentials for monitoring.

The registered credentials are associated with the user in a credential data store. In aspects, a hash of the credential is generated using a first function and stored for comparison with a hash generated from a user input. The technology described herein intercepts user input at the operating system level, generates a hash of the input, and compares it with a hash of a credential being monitored. In one aspect, a hash of the last n characters received is generated where n is the character length of the credential. For example, a hash of the last eight characters entered may be generated and compared to a hash of an eight-character password. In another aspect, hashes of less than the full credential are generated and used to detect potential entry of a credential before the entry is complete. For example, a hash of four characters, five characters, six characters and seven characters could be generated in order to anticipate the entry of an eight-character password. In this scenario, the input strings are hashed at the character lengths that match hashes of partial credentials stored in the credential manager.

A credential entry is detected when a hash for the character string entered matches a hash for a credential being monitored. A potential credential entry is detected when a hash of the character string entered matches a hash for a partial credential.

The method 1900, at block 1930 includes determining a present application context for the application. As described previously, this step may be performed by an operating system component. The features of the application context include, but are not limited to, a process tree, an application process model, inter process communication, API surface, process launch command line arguments, process invocation source (i.e. launched by file manager, another app like outlook, etc.), associated I/O handles, and function call stacks.

The method 1900, at block 1940 includes determining a present network context for the application from an operating system network sensor. As described previously, this step may be performed by an operating system component. A network sensor may receive network status information from a kernel network sensor and possibly other operating system components. The network status information may include the URL, an IP address, a process ID, a SNI, domain information (e.g., domain name), and other characteristics of the ongoing communication sessions between outside resources.

The method 1900, at block 1950 includes detecting a threat in response to a mismatch between the present network context and an expected application context for the application context. As described previously, this step may be performed by an operating system component. The mismatch may be detected by comparing one or more attributes of the expected application context to the present application context.

The method 1900, at block 1960 includes identifying, at the operating system, a threat in response to the mismatch. In this case, the mismatch can mean the credential entry is not being completed in a normal context. The abnormal context indicates a threat to the security or confidentiality of the credential. As described previously, this step may be performed by an operating system component. In one aspect, the threat is detected by analyzing a series of rules that define threats. These rules may result in assignment of a classification to the detected credential entry. Among other possible classifications, the threat assessment may classify the credential input as a valid/invalid location, safe/unsafe application, invalid certificate, password reuse, untrusted, known malicious and unknown.

The method 1900, at block 1970 includes in response to the identifying, initiating, by the operating system, a security mitigation. As described previously, this step may be performed by an operating system component. Various mitigation actions may be taken when a threat is detected. A threat classification may trigger a mitigation action, such as blocking communication of the credential to the URL or suspension of the credential. A user and/or system administrator may specify the mitigation action taken when a threat is detected. Different mitigation actions may be specified for different threat classifications. One type of mitigation is threat reporting. Useful sensor data and telemetry may be sent to a cloud protection service associated with the operating system vendor, to a system administrator associated with an organization (e.g., employer) managing the computing device. The same information may be made accessible to a user of the device being monitored. Phishing determinations may also be shared (considering all compliance and privacy guidelines) with a centralized threat protection service that would benefit from leveraging the phishing data to better protect customers from phishing.

The mitigation actions can also include user awareness efforts. From the user perspective, the phishing protection may have generic (not application specific) user interfaces that allow for blocking phishing attempts, changing passwords, warning about detected risks, phishing education, and social engineering training. These last two options may appeal to enterprises that would like to deliver targeted additional security training to end-users. Application specific user interfaces can also be used. The communication of threat detection information could be enabled via a public API.

Detection of password reuse may result in a notification being communicated to the user and/or the organization. Suspension of the password is another possible mitigation in response to detecting password reuse or other threat.

Exemplary Operating Environment

Figure 17:
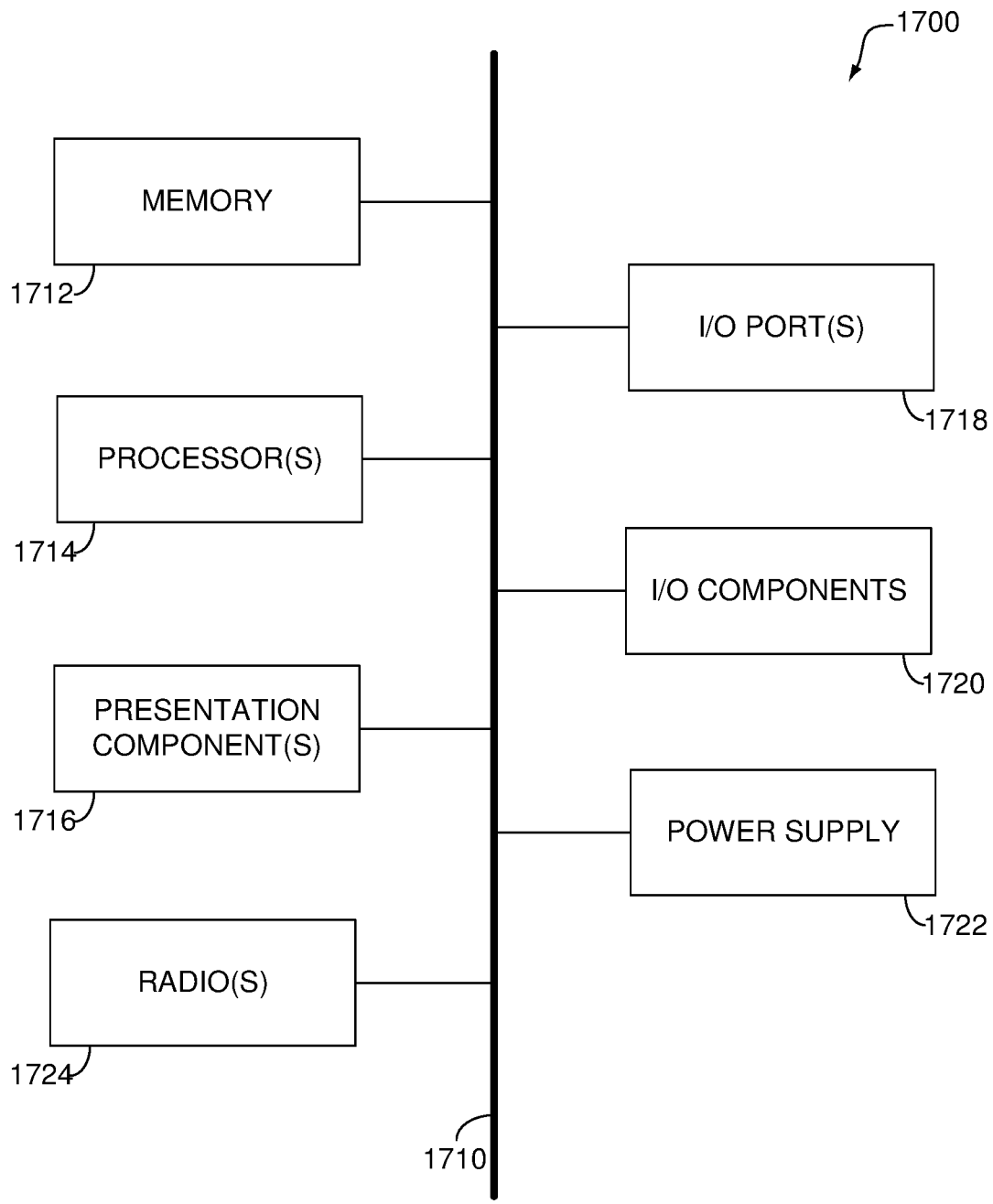
FIG. 17 is a block diagram illustrating a computing device suitable for use with aspects of the technology described herein.

Referring to the drawings in general, and initially to FIG. 17 in particular, an exemplary operating environment for implementing aspects of the technology described herein is shown and designated generally as computing device 1700. Computing device 1700 is but one example of a suitable computing environment and is not intended to suggest any limitation as to the scope of use of the technology described herein. Neither should the computing device 1700 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 17, computing device 1700 includes a bus 1710 that directly or indirectly couples the following devices: memory 1712, one or more processors 1714, one or more presentation components 1716, input/output (I/O) ports 1718, I/O components 1720, and an illustrative power supply 1722. Bus 1710 represents what may be one or more busses (such as an address bus, data bus, or a combination thereof). Although the various blocks of FIG. 17 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 17 is merely illustrative of an exemplary computing device that may be used in connection with one or more aspects of the technology described herein. Distinction is not made between such categories as "workstation," "server," "laptop," "handheld device," etc., as all are contemplated within the scope of FIG. 17 and refer to "computer" or "computing device."

Computing device 1700 typically includes a variety of computer-readable media. Computer-readable media may be any available media that may be accessed by computing device 1700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1712 includes computer storage media in the form of volatile and/or nonvolatile memory. The memory 1712 may be removable, non-removable, or a combination thereof. Exemplary memory includes solid-state memory, hard drives, optical-disc drives, etc. Computing device 1700 includes one or more processors 1714 that read data from various entities such as bus 1710, memory 1712, or I/O components 1720. Presentation component(s) 1716 present data indications to a user or other device. Exemplary presentation components 1716 include a display device, speaker, printing component, vibrating component, etc. I/O ports 1718 allow computing device 1700 to be logically coupled to other devices, including I/O components 1720, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 1700. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1700. The computing device 1700 may be equipped with depth cameras, such as stereoscopic camera systems, infrared camera systems, RGB camera systems, and combinations of these, for gesture detection and recognition. Additionally, the computing device 1700 may be equipped with accelerometers or gyroscopes that enable detection of motion. The output of the accelerometers or gyroscopes may be provided to the display of the computing device 1700 to render immersive augmented reality or virtual reality.

A computing device may include a radio 1724. The radio 1724 transmits and receives radio communications. The computing device may be a wireless terminal adapted to receive communications and media over various wireless networks. Computing device 1700 may communicate via wireless policies, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 policies.

EMBODIMENTS

Embodiment 1. One or more computer storage media comprising computer-executable instructions that when executed by a computing device cause an operating system component of the computing device to perform a method of detecting and analyzing a credential input. The method comprises receiving an input at the computing device, the input addressed to an application. The method further comprises determining that the input corresponds to a credential. The method further comprises determining a present network context for the application from data provided by an operating system network sensor. The method further comprises detecting a mismatch between the present network context and an expected network context for the application. The method further comprises identifying a threat in response to the mismatch. The method further comprises in response to the identifying, initiating a security mitigation.

Embodiment 2. The media of embodiment 1, wherein features of a network context are selected from a group consisting of a URL, an IP address, a process ID, Server Name Indication (SNI), and domain information.

Embodiment 3. The media of any above embodiment, wherein the credential is associated with a credentialing organization and the expected network context is a URL associated with the credentialing organization.

Embodiment 4. The media of any above embodiment, wherein the input is a first set of characters for a password and the security mitigation is preventing entry of remaining characters in the password.

Embodiment 5. The media of any above embodiment, wherein the input is a first set of characters for a password and the security mitigation is a warning message generated by the operating system.

Embodiment 6. The media of any above embodiment, wherein the method further comprises determining a present application context for the application. Wherein the identifying of the threat is further in response to an additional mismatch between the present application context and an expected application context for the application. Wherein features of an application context are selected from a group consisting of a process tree, an application process model, inter process communication, API surface, process launch command line arguments, process invocation source, associated I/O handles, and function call stacks.

Embodiment 7. The media of claim 1, wherein the method further comprises registering a non-operating system credential with the operating system.

Embodiment 8. A method of detecting and analyzing a credential input by an operating system component. The method comprising receiving an input at a computing device, the input addressed to an application. The method further comprises determining that the input corresponds to a credential. The method further comprises determining a present application context for the application. The method further comprises detecting a mismatch between the present application context and an expected application context for the application. The method further comprises identifying a threat in response to the mismatch. The method further comprises, in response to the identifying, initiating a security mitigation.

Embodiment 9. The method of any above embodiment, wherein features of an application context are selected from a group consisting of a process tree, an application process model, inter process communication, API surface, process launch command line arguments, process invocation source, associated I/O handles, and function call stacks.

Embodiment 10. The method of any above embodiment, wherein the expected application context is a function call stack having a first characteristic and the present application context does not include the first characteristic.

Embodiment 11. The method of any above embodiment, wherein the expected application context is the input being entered into a first process and the present application context is the input being entered into a second process that is different from the first process.

Embodiment 12. The method of embodiment 11, wherein the first process is a credential dialog entry process.

Embodiment 13. The method of any above embodiment, wherein the credential is a password and the threat is password reuse.

Embodiment 14. The method of any above embodiment, further comprising determining a present network context for the application from data provided by an operating system network sensor. Wherein the identifying of the threat is further in response to an additional mismatch between the present network context and an expected network context for the application. Wherein features of a network context are selected from a group consisting of a URL, an IP address, a process ID, Server Name Indication (SNI), and domain information.

Embodiment 15. A system comprising: one or more hardware processors; and
one or more computer-readable media having executable instructions for an operating system component embodied thereon, which, when executed by the one or more processors, cause the one or more hardware processors to execute actions comprising receiving an input at the system, the input addressed to an application. The actions further comprising determining that the input corresponds to a credential. The actions further comprising determining a present application context for the application. The actions further comprising determining a present network context for the application from data provided by an operating system network sensor. The actions further comprising detecting a mismatch between the present network context and an expected network context for the present application context. The actions further comprising identifying a threat in response to the mismatch. The actions further comprising, in response to the identifying, initiating a security mitigation.

Embodiment 16. The system of any above embodiment, wherein features of an application context are selected from a group consisting of a process tree, an application process model, inter process communication, API surface, process launch command line arguments, process invocation source, associated I/O handles, and function call stacks.

Embodiment 17. The system of any above embodiment, wherein features of a network context are selected from a group consisting of a URL, an IP address, a process ID, Server Name Indication (SNI), and domain information.

Embodiment 18. The system of any above embodiment, wherein an expected application context for the credential is entry of the password into a first application and the present application context is entry of the credential into a second application.

Embodiment 19. The system of any above embodiment, wherein the credential is a password and the threat is an unsafe application for a password, wherein the unsafe application is not authorized to receive the password.

Embodiment 20. The system of any above embodiment, wherein the method further comprises registering a non-operating system credential with the operating system.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. One or more computer storage media comprising computer-executable instructions that when executed by a computing device cause an operating system component of the computing device to perform a method of detecting and analyzing a credential input, the method comprising:
   receiving an input at the computing device, the input addressed to an application;
   determining that the input corresponds to a credential;
   determining a present network context for the application from data provided by an operating system network sensor;
   detecting a mismatch between an active URL in the present network context and one or more URLs that are part of an expected network context for the application during credential entry;
   identifying a threat in response to the mismatch; and
   in response to the identifying, initiating a security mitigation.

2. The media of claim 1, wherein features of a network context are selected from a group consisting of an IP address, a process ID, Server Name Indication (SNI), and domain information.

3. The media of claim 1, wherein the credential is associated with a credentialing organization and the expected network context is a URL associated with the credentialing organization.

4. The media of claim 1, wherein the input is a first set of characters for a password and the security mitigation is preventing entry of remaining characters in the password.

5. The media of claim 1, wherein the input is a first set of characters for a password and the security mitigation is a warning message generated by the operating system.

6. The media of claim 1, wherein the method further comprises:
   determining a present application context for the application;
   wherein the identifying of the threat is further in response to an additional mismatch between the present application context and an expected application context for the application; and
   wherein features of an application context are selected from a group consisting of a process tree, an application process model, inter process communication, API surface, process launch command line arguments, process invocation source, associated I/O handles, and function call stacks.

7. The media of claim 1, wherein the method further comprises registering a non-operating system credential with the operating system.

8. A method of detecting and analyzing a credential input by an operating system component, the method comprising:

receiving an input at a computing device, the input addressed to an application;

determining that the input corresponds to a credential;

determining a present application context for the application;

detecting a mismatch between entry of the credential in the present application context and an expected application context for the application that does not include entry of any credential;

identifying a threat in response to the mismatch; and in response to the identifying, initiating a security mitigation.

9. The method of claim 8, wherein features of an application context are selected from a group consisting of a process tree, an application process model, inter process communication, API surface, process launch command line arguments, process invocation source, associated I/O handles, and function call stacks.

10. The method of claim 8, wherein the expected application context is a function call stack having a first characteristic and the present application context does not include the first characteristic.

11. The method of claim 8, wherein the expected application context is the input being entered into a first process and the present application context is the input being entered into a second process that is different from the first process.

12. The method of claim 11, wherein the first process is a credential dialog entry process.

13. The method of claim 8, wherein the credential is a password and the threat is password reuse.

14. The method of claim 8, further comprising:

determining a present network context for the application from data provided by an operating system network sensor;

wherein the identifying of the threat is further in response to an additional mismatch between the present network context and an expected network context for the application; and wherein features of a network context are selected from a group consisting of a URL, an IP address, a process ID, Server Name Indication (SNI), and domain information.

15. A system comprising:

one or more hardware processors; and one or more computer-readable media having executable instructions for an operating system component embodied thereon, which, when executed by the one or more processors, cause the one or more hardware processors to execute actions comprising:

receiving an input at the system, the input addressed to an application;

determining that the input corresponds to a credential;

determining a present application context for the application;

determining a present operating system context for the application from data provided by an operating system network sensor;

detecting a mismatch between an active process ID in the present operating system context and an expected operating system context for the present application context, wherein the expected operating system context does not include the active process ID being active for the application during credential entry;

identifying a threat in response to the mismatch; and in response to the identifying, initiating a security mitigation.

16. The system of claim 15, wherein features of an application context are selected from a group consisting of a process tree, an application process model, inter process communication, API surface, process launch command line arguments, process invocation source, associated I/O handles, and function call stacks.

17. The system of claim 15, wherein features of a network context are selected from a group consisting of a URL, an IP address, Server Name Indication (SNI), and domain information.

18. The system of claim 15, wherein an expected application context for the credential is entry of the password into a first application and the present application context is entry of the credential into a second application.

19. The system of claim 15, wherein the credential is a password and the threat is an unsafe application for a password, wherein the unsafe application is not authorized to receive the password.

20. The system of claim 15, wherein the method further comprises registering a non-operating system credential with the operating system.

* * * * *